US009385539B2

(12) United States Patent
Zhamu et al.

(10) Patent No.: US 9,385,539 B2
(45) Date of Patent: *Jul. 5, 2016

(54) SURFACE-MEDIATED CELL-POWERED PORTABLE COMPUTING DEVICES AND METHODS OF OPERATING SAME

(75) Inventors: Aruna Zhamu, Centerville, OH (US); Guorong Chen, Fairborn, OH (US); Xiqing Wang, Cincinnati, OH (US); Bor Z. Jang, Centerville, OH (US); Yanbo Wang, Fairborn, OH (US); Qing Fang, Fairborn, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1132 days.

This patent is subject to a terminal disclaimer.

(21) Appl. No.: 13/385,245

(22) Filed: Feb. 10, 2012

(65) Prior Publication Data

US 2013/0212409 A1 Aug. 15, 2013

(51) Int. Cl.
*H02J 7/00* (2006.01)
*G06F 1/26* (2006.01)

(52) U.S. Cl.
CPC .. *H02J 7/00* (2013.01); *G06F 1/263* (2013.01)

(58) Field of Classification Search
CPC .............................. H01M 10/052; H01M 4/00
USPC .............. 320/114, 116, 117; 429/50, 51, 149, 429/322
See application file for complete search history.

(56) References Cited

U.S. PATENT DOCUMENTS

| | | | | |
|---|---|---|---|---|
| 5,200,281 A | * | 4/1993 | Leap et al. ..................... | 429/129 |
| 6,014,030 A | * | 1/2000 | Smith .............. | G01R 19/16542 |
| | | | | 320/128 |
| 6,639,381 B2 | | 10/2003 | Tamura et al. | |
| 6,771,045 B1 | * | 8/2004 | Keller ........................... | 320/118 |
| 8,914,176 B2 | * | 12/2014 | Zhamu ...................... | B61C 7/04 |
| | | | | 701/22 |
| 2006/0017421 A1 | * | 1/2006 | Solie ........................ | H02J 7/022 |
| | | | | 323/225 |
| 2008/0111521 A1 | * | 5/2008 | So et al. ........................ | 320/137 |
| 2010/0285358 A1 | * | 11/2010 | Cui ........................ | H01M 4/134 |
| | | | | 429/218.1 |
| 2011/0163723 A1 | * | 7/2011 | Tan et al. ...................... | 320/134 |
| 2012/0299554 A1 | * | 11/2012 | Kruglick ............... | H02J 7/0073 |
| | | | | 320/160 |

OTHER PUBLICATIONS

U.S. Appl. No. 12/930,294, filed Jan. 93, 2011, A. Zhamu, et al.
U.S. Appl. No. 12/928,927, filed Dec. 23, 2010, A. Zhamu, et al.
U.S. Appl. No. 12/806,679, filed Aug. 9, 2010, C. G. Liu, et al.
U.S. Appl. No. 12/924,211, filed Sep. 23, 2010, C. G. Liu, et al.
U.S. Appl. No. 13/199,713, filed Sep. 7, 2011, A. Zhamu, et al.
U.S. Appl. No. 11/800,728, filed May 8, 2007, A. Zhamu, et al.
U.S. Appl. No. 13/374,321, filed Dec. 21, 2011, A. Zhamu, et al.
U.S. Appl. No. 13/374,894, filed Jan. 23, 2012, A. Zhamu, et al.
B. Z. Jang, et al. "Graphene Surface-Enabled Lithium Ion-Exchanging Cells: Next-Generation High-Power Energy Storage Devices," Nano Letters, 11 (2011) 3785-3791.

* cited by examiner

Primary Examiner — Richard Isla Rodas
Assistant Examiner — Johali Torres Ruiz

(57) ABSTRACT

This invention provides a portable computing device powered by a surface-mediated cell (SMC)-based power source, the portable device comprising a computing hardware sub-system and a rechargeable power source electrically connected to the hardware and providing power thereto, wherein the power source contains at least a surface-mediated cell. The portable computing device is selected from a laptop computer, a tablet, an electronic book (e-book), a smart phone, a mobile phone, a digital camera, a hand-held calculator or computer, or a personal digital assistant.

29 Claims, 14 Drawing Sheets

SURFACE-MEDIATED CELL-POWERED PORTABLE COMPUTING DEVICES AND METHODS OF OPERATING SAME

This application claims the benefits of the following applications: (1) Aruna Zhamu, et al., "Surface-Mediated Lithium Ion-Exchanging Energy Storage Device," U.S. patent application Ser. No. 13/199,450 (Aug. 30, 2011). (2) Aruna Zhamu, et al., "Partially Surface-Mediated Lithium Ion-Exchanging Cells and Method of Operating Same," U.S. patent application Ser. No. 13/199,713 (Sep. 7, 2011). (3) Aruna Zhamu, et al., "Stacks of Internally Connected Surface-Mediated Cells and Methods of Operating Same," U.S. patent application Ser. No. 13/374,321 (Dec. 21, 2011). (4) Aruna Zhamu, Guorong Chen, Qing Fang, Xiqing Wang, Yanbo Wang, and Bor Z. Jang, "Surface-Mediated Cell-Powered Vehicles and Methods of Operating Same," U.S. patent application Ser. No. 13/374,894 (Jan. 23, 2012). (5) Aruna Zhamu, Guorong Chen, Qing Fang, Xiqing Wang, Yanbo Wang, and Bor Z. Jang, "Surface-Mediated Cells with High Power Density and High Energy Density," US patent application submitted on Feb. 5, 2012.

FIELD OF THE INVENTION

This invention relates generally to the field of portable energy storage devices for powering portable electronic devices and, more particularly, to a portable computing device powered by a surface-mediated cell (SMC)-based energy storage system.

BACKGROUND OF THE INVENTION

Any discussion of the prior art throughout the specification should in no way be considered as an admission that such prior art is widely known or forms part of common general knowledge in the field.

Considerable effort has been expended in the development of portable power supplies for portable computing devices (e.g. laptop computers) and portable wireless computing devices (e.g. smart phones). The most commonly followed approach is to make use of a battery pack that is periodically recharged from the mains supply. The battery pack typically includes a plurality of interlinked batteries in combination with protection circuitry to prevent the current provided by the batteries from exceeding a predetermined maximum operational current.

The load current drawn by computing devices varies greatly, and often sharply, with time. This creates enormous voltage ripple for the battery pack. This is not ideal for most batteries, many of which are best suited to provide steady current levels. Moreover, the peak load currents are often large in comparison to the average load current, although only of short duration. This requires that additional complexity be designed into the protection circuit to prevent undesirable triggering of that circuit. To address these issues, supercapacitors have been used to supply power to portable electronic devices, although as a source secondary to the battery pack. Such devices are usually accompanied by a second protection circuit to limit the flow of current to and from the supercapacitor. This circuitry tends to significantly degrade the effectiveness of the supercapacitor in these applications.

A combination of a battery pack and a supercapacitor device adds a considerably higher level of complexity, weight, and cost to the power system. Moreover, both supercapacitors and batteries have their own intrinsic drawbacks that cannot be overcome even when they are combined or integrated into a power system. These would be better understood after the reader reviews the following background information.

Supercapacitors (Ultra-Capacitors or Electro-Chemical Capacitors):

The high volumetric capacitance density of a supercapacitor derives from using porous electrodes to create a large surface area conducive to the formation of diffuse electric double layer (EDL) charges. The ionic species (cations and anions) in the EDL are formed in the electrolyte near an electrode surface (but not on the electrode surface per se) when voltage is imposed upon a symmetric supercapacitor (or EDLC), as schematically illustrated in FIG. 1(A). The required ions for this EDL mechanism pre-exist in the liquid electrolyte (randomly distributed in the electrolyte) when the cell is made or in a discharged state (FIG. 1(B)). These ions do not come from the opposite electrode material. In other words, the required ions to be formed into an EDL near the surface of a negative electrode (anode) active material (e.g., activated carbon particle) do not come from the positive electrode (cathode); i.e., they are not previously captured or stored in the surfaces or interiors of a cathode active material. Similarly, the required ions to be formed into an EDL near the surface of a cathode active material do not come from the surface or interior of an anode active material.

When the supercapacitor is re-charged, the ions (both cations and anions) already pre-existing in the liquid electrolyte are formed into EDLs near their respective local electrodes. There is no exchange of ions between an anode active material and a cathode active material. The amount of charges that can be stored (capacitance) is dictated solely by the concentrations of cations and anions that pre-exist in the electrolyte. These concentrations are typically very low and are limited by the solubility of a salt in a solvent, resulting in a low energy density.

In some supercapacitors, the stored energy is further augmented by pseudo-capacitance effects due to some electro-chemical reactions (e.g., redox). In such a pseudo-capacitor, the ions involved in a redox pair also pre-exist in the electrolyte. Again, there is no exchange of ions between an anode active material and a cathode active material.

Since the formation of EDLs does not involve a chemical reaction or an exchange of ions between the two opposite electrodes, the charge or discharge process of an EDL supercapacitor can be very fast, typically in seconds, resulting in a very high power density (more typically 3,000-8,000 W/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 20-30 Wh/Kg for the lead acid battery and 50-100 Wh/kg for the NiMH battery). Lithium-ion batteries possess a much higher energy density, typically in the range of 100-180 Wh/kg, based on the total cell weight.

Lithium-Ion Batteries (LIB):

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between the interior of an anode and the interior of a cathode, which requires lithium ions to enter or intercalate into the bulk of anode active material particles during re-charge, and into the bulk of cathode active material particles during discharge. For instance, as illustrated in FIG. 1(C), in a most commonly used lithium-ion battery featuring graphite particles as an anode active material, lithium ions are required to diffuse into the inter-planar spaces of a graphite crystal at the anode during re-charge. Most of these lithium ions have to come all the way from the cathode side by diffusing out of the bulk of a cathode active particle, through the pores of a solid separator (pores being filled with a liquid electrolyte), and into the bulk of a graphite particle at the anode.

During discharge, lithium ions diffuse out of the anode active material (e.g. de-intercalate out of graphite particles 10 μm in diameter), migrate through the liquid electrolyte phase, and then diffuse into the bulk of complex cathode crystals (e.g. intercalate into particles lithium cobalt oxide, lithium iron phosphate, or other lithium insertion compound), as illustrated in FIG. 1(D). Because liquid electrolyte only reaches the external surface (not interior) of a solid particle (e.g. graphite particle), lithium ions swimming in the liquid electrolyte can only migrate (via fast liquid-state diffusion) to the surface of a graphite particle. To penetrate into the bulk of a solid graphite particle would require a slow solid-state diffusion (commonly referred to as "intercalation") of lithium ions. The diffusion coefficients of lithium in solid particles of lithium metal oxide are typically $10^{-16}$-$10^{-8}$ cm$^2$/sec (more typically $10^{-14}$-$10^{-10}$ cm$^2$/sec), and those of lithium in liquid are approximately $10^{-6}$ cm$^2$/sec.

In other words, these intercalation or solid-state diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

Lithium Ion Capacitors (LIC):

A hybrid energy storage device that is developed for the purpose of combining some features of an EDL supercapacitor (or symmetric supercapacitor) and those of a lithium-ion battery (LIB) is a lithium-ion capacitor (LIC). A LIC contains a lithium intercalation compound (e.g., graphite particles) as an anode and an EDL capacitor-type cathode (e.g. activated carbon, AC), as schematically illustrated in FIG. 1(E). In a commonly used LIC, $LiPF_6$ is used as an electrolyte salt, which is dissolved in a solvent, such as propylene carbonate. When the LIC is in a charged state, lithium ions are retained in the interior of the lithium intercalation compound anode (usually micron-scaled graphite particles) and their counter-ions (e.g. negatively charged $PF_6^-$) are disposed near activated carbon surfaces (but not on an AC surface, or captured by an AC surface), as illustrated in FIG. 1(E).

When the LIC is discharged, lithium ions migrate out from the interior of graphite particles (a slow solid-state diffusion process) to enter the electrolyte phase and, concurrently, the counter-ions $PF_6^-$ are also released from the EDL zone, moving further away from AC surfaces into the bulk of the electrolyte. In other words, both the cations ($Li^+$ ions) and the anions ($PF_6^-$) are randomly disposed in the liquid electrolyte, not associated with any electrode (FIG. 1(F)). This implies that, just like in a symmetric supercapacitor, the amounts of both the cations and the anions that dictate the specific capacitance of a LIC are essentially limited by the solubility limit of the lithium salt in a solvent (i.e. limited by the amount of $LiPF_6$ that can be dissolved in the solvent). Therefore, the energy density of LICs (a maximum of 14 Wh/kg) is not much higher than that (6 Wh/kg) of an EDLC (symmetric supercapacitor), and remains an order of magnitude lower than that (most typically 120-150 Wh/kg) of a LIB.

Furthermore, due to the need to undergo de-intercalation and intercalation at the anode, the power density of a LIC is not high (typically <15 kW/kg, which is comparable to or only slightly higher than those of an EDLC).

The above review of the prior art indicates that a battery has a higher energy density, but is incapable of delivering a high power (high currents or pulse power) that a portable device needs for certain functions. A power source containing a battery alone is also not capable of being rapidly recharged (e.g., fully recharged in less than 30 minutes, preferably less than 10 minutes, and most preferably less than 1 minute). A supercapacitor or LIC can deliver a higher power, but does not store much energy (the stored energy only lasts for a short duration of operating time) and, hence, cannot be a single power source alone to meet the energy/power needs of a portable electronic device.

More Recent Developments:

Most recently, our research group has invented a revolutionary class of high-power and high-energy-density energy storage devices now commonly referred to as the surface-mediated cell (SMC). This has been reported in the following patent applications and a scientific paper:

1. C. G. Liu, et al., "Lithium Super-battery with a Functionalized Nano Graphene Cathode," U.S. patent application Ser. No. 12/806,679 (Aug. 19, 2010).
2. C. G. Liu, et al, "Lithium Super-battery with a Functionalized Disordered Carbon Cathode," U.S. patent application Ser. No. 12/924,211 (Sep. 23, 2010).
3. Aruna Zhamu, C. G. Liu, David Neff, and Bor Z. Jang, "Surface-Controlled Lithium Ion-Exchanging Energy Storage Device," U.S. patent application Ser. No. 12/928,927 (Dec. 23, 2010).
4. Aruna Zhamu, C. G. Liu, David Neff, Z. Yu, and Bor Z. Jang, "Partially and Fully Surface-Enabled Metal Ion-Exchanging Battery Device," U.S. patent application Ser. No. 12/930,294 (Jan. 3, 2011).
5. Aruna Zhamu, Chen-guang Liu, X. Q. Wang, and Bor Z. Jang, "Surface-Mediated Lithium Ion-Exchanging Energy Storage Device," U.S. patent application Ser. No. 13/199,450 (Aug. 30, 2011).
6. Aruna Zhamu, Chen-guang Liu, and Bor Z. Jang, "Partially Surface-Mediated Lithium Ion-Exchanging Cells and Method of Operating Same," U.S. patent application Ser. No. 13/199,713 (Sep. 7, 2011).
7. Bor Z. Jang, C. G. Liu, D. Neff, Z. Yu, Ming C. Wang, W. Xiong, and A. Zhamu, "Graphene Surface-Enabled Lithium Ion-Exchanging Cells: Next-Generation High-Power Energy Storage Devices," *Nano Letters*, 2011, 11 (9), pp 3785-3791.

There are two types of SMCs: partially surface-mediated cells (p-SMC, also referred to as lithium super-batteries) and fully surface-mediated cells (f-SMC). Both types of SMCs contain the following components:

(a) An anode containing an anode current collector (such as copper foil) in a lithium super-battery or p-SMC, or an anode current collector plus an anode active material in an f-SMC. The anode active material is preferably a nano-carbon material (e.g., graphene) having a high specific surface area (preferably >100 m²/g, more preferably >500 m²/g, further preferably >1,000 m²/g, and most preferably >1,500 m²/g);
(b) A cathode containing a cathode current collector and a cathode active material (e.g. graphene or disordered carbon) having a high specific surface area (preferably >100 m²/g, more preferably >500 m²/g, further preferably >1,000 m²/g, still more preferably >1,500 m²/g, and most preferably >2,000 m²/g);
(c) A porous separator separating the anode and the cathode, soaked with an electrolyte (preferably liquid or gel electrolyte); and
(d) A lithium source disposed in an anode or a cathode (or both) and in direct contact with the electrolyte.

In a fully surface-mediated cell, f-SMC, as illustrated in FIG. 2, both the cathode active material and the anode active material are porous, having large amounts of graphene surfaces in direct contact with liquid electrolyte. These electrolyte-wetted surfaces are ready to interact with nearby lithium ions dissolved therein, enabling fast and direct adsorption of lithium ions on graphene surfaces and/or redox reaction between lithium ions and surface functional groups, thereby removing the need for solid-state diffusion or intercalation. When the SMC cell is made, particles or foil of lithium metal are implemented at the anode (FIG. 2A), which are ionized during the first discharge cycle, supplying a large amount of lithium ions. These ions migrate to the nano-structured cathode through liquid electrolyte, entering the pores and reaching the surfaces in the interior of the cathode without having to undergo solid-state intercalation (FIG. 2B). When the cell is re-charged, a massive flux of lithium ions are quickly released from the large amounts of cathode surfaces, migrating into the anode zone. The large surface areas of the nano-structured anode enable concurrent and high-rate deposition of lithium ions (FIG. 2C), re-establishing an electrochemical potential difference between the lithium-decorated anode and the cathode.

A particularly useful nano-structured electrode material is nano graphene platelet (NGP), which refers to either a single-layer graphene sheet or multi-layer graphene platelets. A single-layer graphene sheet is a 2-D hexagon lattice of carbon atoms covalently bonded along two plane directions. We have studied a broad array of graphene materials for electrode uses: pristine graphene, graphene oxide, chemically or thermally reduced graphene, graphene fluoride, chemically modified graphene, hydrogenated graphene, nitrogenated graphene, doped graphene. In all cases, both single-layer and multi-layer graphene were prepared from natural graphite, petroleum pitch-derived artificial graphite, micron-scaled graphite fibers, activated carbon (AC), and treated carbon black (t-CB). AC and CB contain narrower graphene sheets or aromatic rings as a building block, while graphite and graphite fibers contain wider graphene sheets. Their micro-structures all have to be exfoliated (to increase inter-graphene spacing in graphite) or activated (to open up nano gates or pores in t-CB) to allow liquid electrolyte to access more graphene edges and surfaces where lithium can be captured. Other types of disordered carbon studied have included soft carbon (including meso-phase carbon, such as meso-carbon micro-beads), hard carbon (including petroleum coke), and amorphous carbon, in addition to carbon black and activated carbon. All these carbon/graphite materials have graphene sheets dispersed in their microstructure.

These highly conducting materials, when used as a cathode active material, can have a functional group that is capable of rapidly and reversibly forming a redox reaction with lithium ions. This is one possible way of capturing and storing lithium directly on a graphene surface (including edge). We have also discovered that the benzene ring centers of graphene sheets are highly effective and stable sites for capturing and storing lithium atoms, even in the absence of a lithium-capturing functional group.

Similarly, in a lithium super-battery (p-SMC), the cathode includes a chemically functionalized NGP or a functionalized disordered carbon material having certain specific functional groups capable of reversibly and rapidly forming/releasing a redox pair with a lithium ion during the discharge and charge cycles of a p-SMC. In a p-SMC, the disordered carbon or NGP is used in the cathode (not the anode) of the lithium super-battery. In this cathode, lithium ions in the liquid electrolyte only have to migrate to the edges or surfaces of graphene sheets (in the case of functionalized NGP cathode), or the edges/surfaces of the aromatic ring structures (small graphene sheets) in a disordered carbon matrix. No solid-state diffusion is required at the cathode. The presence of a functionalized graphene or carbon having functional groups thereon enables reversible storage of lithium on the surfaces (including edges), not the bulk, of the cathode material. Such a cathode material provides one type of lithium-storing or lithium-capturing surface. Again, another possible mechanism is based on the benzene ring centers of graphene sheets that are highly effective and stable sites for capturing and storing lithium atoms.

In a lithium super-battery or p-SMC, the anode comprises a current collector and a lithium foil alone (as a lithium source), without an anode active material to support or capture lithium ions/atoms. Lithium has to deposit onto the front surface of an anode current collector alone (e.g. copper foil) when the battery is re-charged. Since the specific surface area of a current collector is very low (typically <1 m²/gram), the over-all lithium re-deposition rate can be relatively low as compared to f-SMC.

The features and advantages of SMCs that differentiate the SMC from conventional lithium-ion batteries (LIB), supercapacitors, and lithium-ion capacitors (LIC) are summarized below:
(A) In an SMC, lithium ions are exchanged between anode surfaces and cathode surfaces, not bulk or interior:
  a. The conventional LIB stores lithium in the interior of an anode active material (e.g. graphite particles) in a charged state (e.g. FIG. 1(C)) and the interior of a cathode active material in a discharged state (FIG. 1(D)). During the discharge and charge cycles of a LIB, lithium ions must diffuse into and out of the bulk of a cathode active material, such as lithium cobalt oxide ($LiCoO_2$) and lithium iron phosphate ($LiFePO_4$). Lithium ions must also diffuse in and out of the inter-planar spaces in a graphite crystal serving as an anode active material. The lithium insertion or extraction procedures at both the cathode and the anode are very slow, resulting in a low power density and requiring a long re-charge time.
  b. When in a charged state, a LIC also stores lithium in the interior of graphite anode particles (FIG. 1(E)), thus requiring a long re-charge time as well. During discharge, lithium ions must also diffuse out of the interior of graphite particles, thereby compromising the power density. The lithium ions (cations $Li^+$) and their counter-ions (e.g. anions $PF_6^-$) are randomly dispersed in the liquid electrolyte when the LIC is in a discharged state (FIG. 1(F)). In contrast, the lithium ions are captured by graphene surfaces (e.g. at centers of benzene rings of a graphene sheet as illustrated in FIG. 2(D)) when an SMC is in a discharged state.

Lithium is deposited on the surface of an anode (anode current collector and/or anode active material) when the SMC is in a charged state. Relatively few lithium ions stay in the liquid electrolyte.

c. When in a charged state, a symmetric supercapacitor (EDLC) stores their cations near a surface (but not at the surface) of an anode active material (e.g. activated carbon, AC) and stores their counter-ions near a surface (but not at the surface) of a cathode active material (e.g., AC), as illustrated in FIG. 1(A). When the EDLC is discharged, both the cations and their counter-ions are re-dispersed randomly in the liquid electrolyte, further away from the AC surfaces (FIG. 1(B)). In other words, neither the cations nor the anions are exchanged between the anode surface and the cathode surface.

d. For a supercapacitor exhibiting a pseudo-capacitance or redox effect, either the cation or the anion form a redox pair with an electrode active material (e.g. polyaniline or manganese oxide coated on AC surfaces) when the supercapacitor is in a charged state. However, when the supercapacitor is discharged, both the cations and their counter-ions are re-dispersed randomly in the liquid electrolyte, away from the AC surfaces. Neither the cations nor the anions are exchanged between the anode surface and the cathode surface. In contrast, the cations ($Li^+$) are captured by cathode surfaces (e.g. graphene benzene ring centers) when the SMC is in the discharged state. It is also the cations ($Li^+$) that are captured by surfaces of an anode current collector and/or anode active material) when the SMC is in the discharged state. The lithium ions are exchanged between the anode and the cathode.

e. An SMC operates on the exchange of lithium ions between the surfaces of an anode (anode current collector and/or anode active material) and a cathode (cathode active material). The cathode in a SMC has (a) benzene ring centers on a graphene plane to capture and release lithium; (b) functional groups. (e.g. attached at the edge or basal plane surfaces of a graphene sheet) that readily and reversibly form a redox reaction with a lithium ion from a lithium-containing electrolyte; and (c) surface defects to trap and release lithium during discharge and charge. Unless the cathode active material (e.g. graphene, CNT, or disordered carbon) is heavily functionalized, mechanism (b) does not significantly contribute to the lithium storage capacity.

When the SMC is discharged, lithium ions are released from the surfaces of an anode (surfaces of an anode current collector and/or surfaces of an anode active material, such as graphene). These lithium ions do not get randomly dispersed in the electrolyte. Instead, these lithium ions swim through liquid electrolyte and get captured by the surfaces of a cathode active material. These lithium ions are stored at the benzene ring centers, trapped at surface defects, or captured by surface/edge-borne functional groups. Very few lithium ions remain in the liquid electrolyte phase.

When the SMC is re-charged, massive lithium ions are released from the surfaces of a cathode active material having a high specific surface area. Under the influence of an electric field generated by an outside battery charger, lithium ions are driven to swim through liquid electrolyte and get captured by anode surfaces, or are simply electrochemically plated onto anode surfaces.

(B) In a discharged state of a SMC, a great amount of lithium atoms are captured on the massive surfaces of a cathode active material. These lithium ions in a discharged SMC are not dispersed or dissolved in the liquid electrolyte, and not part of the electrolyte. Therefore, the solubility limit of lithium ions and/or their counter-ions does not become a limiting factor for the amount of lithium that can be captured at the cathode side. It is the specific surface area at the cathode that dictates the lithium storage capacity of an SMC provided there is a correspondingly large amount of available lithium atoms at the lithium source prior to the first discharge/charge.

(C) During the discharge of an SMC, lithium ions coming from the anode side through a separator only have to diffuse in the liquid electrolyte residing in the cathode to reach a surface/edge of a graphene plane. These lithium ions do not need to diffuse into or out of the volume (interior) of a solid particle. Since no diffusion-limited intercalation is involved at the cathode, this process is fast and can occur in seconds. Hence, this is a totally new class of energy storage device that exhibits unparalleled and unprecedented combined performance of an exceptional power density, high energy density, long and stable cycle life, and wide operating temperature range. This device has exceeded the best of both battery and supercapacitor worlds.

(D) In an f-SMC, the energy storage device operates on lithium ion exchange between the cathode and the anode. Both the cathode and the anode (not just the cathode) have a lithium-capturing or lithium-storing surface and both electrodes (not just the cathode) obviate the need to engage in solid-state diffusion. Both the anode and the cathode have large amounts of surface areas to allow lithium ions to deposit thereon simultaneously, enabling dramatically higher charge and discharge rates and higher power densities.

The uniform dispersion of these surfaces of a nano-structured material (e.g. graphene, CNT, disordered carbon, nano-wire, and nano-fiber) at the anode also provides a more uniform electric field in the electrode in which lithium can more uniformly deposit without forming a dendrite. Such a nano-structure eliminates the potential formation of dendrites, which was the most serious problem in conventional lithium metal batteries (commonly used in 1980s and early 1990s before being replaced by lithium-ion batteries).

(E) A SMC typically has an open-circuit voltage of >1.0 volts (most typically >1.5 volts) and can operate up to 4.5 volts for lithium salt-based organic electrolyte. Using an identical electrolyte, an EDLC or symmetric supercapacitor has an open-circuit voltage of essentially 0 volts and can only operate up to 2.7 volts. Also using an identical electrolyte, a LIC operates between 2.2 volts and 3.8 volts. These are additional manifestations of the notion that the SMC is fundamentally different and patently distinct from both an EDLC and a LIC.

The amount of lithium stored in the lithium source when a SMC is made dictates the amount of lithium ions that can be exchanged between an anode and a cathode. This, in turn, dictates the energy density of the SMC.

Batteries for Portable Device Applications

One of the shortcomings of modern rechargeable batteries (e.g. nickel metal hydride and lithium-ion batteries) used to power portable electronic devices is the poor power density (typically <0.5 kW/kg), resulting in a long battery recharge time and the inability to provide high currents or pulsed power. Examples of portable electronic devices include the laptop computer, mobile phone, wireless communications device, digital camera, tablet, power tool, electronic cashier machine, electronic meter, robot, actuator, battery-operated portable power supply, small uninterrupted power source (UPS), and medical device, etc.

A digital camera typically depends upon the use of a supercapacitor to provide the flashlight function, in addition to a battery that powers other camera functions and recharges the supercapacitor. An UPS typically makes use of a fast-response device (e.g. a supercapacitor-activated switch) to swiftly connect a battery to an external load.

As an example of a medical device, a portable defibrillator contains a power source composed of a first power pack and a rechargeable second power pack (e.g. P. S. Tamura, et al., U.S. Pat. No. 6,639,381, Oct. 28, 2003). The first power pack (typically a primary battery, such as lithium thionyl chloride battery) charges the second power pack. The second power pack supplies most of the energy needed to administer a defibrillation shock, typically requiring pulsed power (high currents) supplied from a supercapacitor. Such a battery-supercapacitor configuration is bulky and heavy, which is a highly undesirable feature for a portable medical device application.

The use of supercapacitors in combination with batteries might appear to address the apparent shortcomings of both technologies, however, the peculiar charging/discharging characteristics of the battery component must still be addressed in the operational algorithm. The supercapacitor-battery combination in series connection limits the current to that of the battery limits. Operating the supercapacitor-battery in parallel limits the extraction of total energy from the supercapacitor to that of the battery, a considerable reduction.

Others have identified approaches with switched banks of supercapacitors, or in combination with batteries, to avert the extreme voltage reduction that would be experienced by continuing to draw from a single supercapacitor. However, this methodology results in significant underutilization of the capability of the supercapacitor system (typically less than 50% as voltage input variations are limited to 2:1 for many devices). The addition of banks (either battery or supercapacitor) bring increased switching components/complexity, efficiency loss, increased weight and cost.

Thus, it is an object of the present invention to provide a portable power source that is compact, light-weight, and of high energy density, and to provide a portable electronic device containing such a power source.

It is another object of the present invention to provide a portable power source that contains a single-type electrochemical cell exhibiting a high energy density and high power density (not involving a battery-supercapacitor combination), and to provide a portable device containing such a power source.

It is yet another object of the present invention to provide a portable power source that exhibits a high energy density and is capable of capturing the electric energy converted from human-generated kinetic energy (e.g. using a piezoelectric based charge generator), and to provide a portable electronic device containing such a power source.

Another object of the present invention is to provide a portable power source that can be fully re-charged in less than 15 minutes, preferably less than 5 minutes, and further preferably less than 1 minute.

It is still another object of the present invention to provide a portable device, selected from a laptop computer, mobile phone, digital camera, tablet, power tool, electronic cashier machine, electronic meter, robot, actuator, battery-operated portable power supply, small uninterrupted power source (UPS), or medical device. This portable device has a power source that is compact, light-weight, high-power, and high-energy density and contains at least a SMC cell.

SUMMARY OF THE INVENTION

The present invention provides a portable device powered by a surface-mediated cell-based power source. The portable device comprises a microelectronic device hardware and a rechargeable power source electrically connected to this microelectronic device and providing power thereto, wherein the power source contains at least a surface-mediated cell (SMC). Preferably, the power source contains multiple surface-mediated cells connected in series, in parallel, or a combination of both.

This portable device may further contain a controller electrically connected to the power source, and preferably further contains a DC/DC converter electrically communicating with the controller. The power source can contain a DC/DC converter, a boost converter, or a buck-boost converter electrically connected to a surface-mediated cell or a stack of multiple surface-mediated cells.

In one embodiment of the present invention, the microelectronic device has a computing hardware, function or capability and is selected from a laptop computer, a tablet, an e-book, a smart phone, a mobile phone, a digital camera, a hand-held calculator or computer, or a hand-held medical device.

The power source can contain a stack of a first SMC and at least a second SMC that are internally connected in series, wherein the stack contains at least a bipolar electrode made of a non-porous but electronically conducting solid layer having one surface optionally coated with an anode active material and an opposing surface coated with a cathode active material, and the electrolyte in the first SMC is not in fluid communication with the electrolyte in the second SMC.

In one preferred embodiment, the power source has a first stack of multiple surface-mediated cells electrically communicating with a DC/DC converter, a boost converter, or a buck-boost converter, which electrically communicates with a second stack of multiple surface-mediated cells. The second stack of multiple surface-mediated cells recharges or provides currents to the first stack of multiple surface-mediated cells.

In another preferred embodiment, the power source has a stack of multiple surface-mediated cells electrically communicating with a DC/DC converter, boost converter, or a buck-boost converter, which electrically communicates with an energy storage or energy conversion unit selected from a battery, a supercapacitor, a fuel cell, a thermo-electric unit, a piezoelectric charge generator, a photovoltaic unit, or a combination thereof. Alternatively, the power source has a stack of multiple surface-mediated cells directly communicating with an energy storage or energy conversion unit selected from a battery, a supercapacitor, a fuel cell, a piezoelectric charge generator, a thermo-electric unit, a photovoltaic unit, or a combination thereof without going through a DC/DC converter or a buck-boost converter. The battery may be selected from a lead-acid, nickel metal hydride, zinc-air, aluminum air, lithium-ion, lithium metal rechargeable, lithium-air, lithium-sulfur, or flow battery. The energy storage or energy conversion unit recharges or provides currents to said stack of multiple surface-mediated cells.

The definition and features of the surface-mediated cell (SMC) have been described above. For the purpose of defining the scope of the claims in the instant application, the SMC does not include any lithium-air (lithium-oxygen) cell, lithium-sulfur cell, or any cell wherein the operation of the energy storage device involves the introduction of oxygen from outside of the device, or involves the chemical formation of a metal oxide, metal sulfide, metal selenide, metal telluride, metal hydroxide, or metal-halogen compound at the cathode during the cell discharge. These cells involve a strong cathode reaction during cell discharge and, hence, the re-charge reaction is not very reversible (having very low round-trip efficiency), is very slow, and is of extremely poor power density.

Typically, a surface-mediated cell comprises: (a) A positive electrode (cathode) comprising a cathode active material having a surface area to capture or store lithium thereon and an optional but desirable cathode current collector; (b) A negative electrode (anode) comprising an anode current collector only (for a partially surface-mediated cell, p-SMC), or comprising an anode current collector and an anode active material having a surface area to capture or store lithium thereon; (c) A porous separator disposed between the two electrodes; and (d) A lithium-containing electrolyte in physical contact with the two electrodes, wherein the anode active material (if existing) and/or the cathode active material has a specific surface area of no less than 100 $m^2/g$ which is in direct physical contact with the electrolyte to receive lithium ions therefrom or to provide lithium ions thereto. The electrode active material in a cathode or an anode preferably forms a meso-porous structure that enables electrolyte passage, allowing liquid electrolyte to directly wet the active material surfaces.

The SMC power source can contain a stack of multiple SMC cells that are connected externally or internally in series, in parallel, or a combination of both. In an SMC stack, typically there are at least two anodes and two cathodes in two cells. In an internal parallel connection case, these multiple anodes are connected together to a terminal of an external circuit or battery charger, and the multiple cathodes are connected together to another terminal. These parallel connections essentially provide a configuration having enlarged electrode areas, hence, higher current and higher power.

Another preferred embodiment of the present invention contains a stack of SMC cells that are internally connected in series. As illustrated in FIG. 4 as one example, the internal series connection (ISC) technology involves combining a desired number of bipolar electrodes (e.g. B1-B5), separated from one another by a porous separator (e.g. S1-S6), and cladded by two terminal electrodes (E1 and E2), Only these two terminal electrodes are externally connected to the outside circuit and all the intermediate bipolar electrodes are isolated from the outside circuit. Series connection provides a high voltage output, which is the sum of the voltage values of all cells: one cell giving 3.5-4.5 volts, two cells giving 7.0-9.0 volts, etc.

FIG. 4 provides but one example of the many possible combinations for high-voltage stacks. The five intermediate electrodes (B1-B5) are bipolar electrodes, each composed of a non-porous conductive metal foil having one surface coated with an anode active material and the opposing surface coated with a cathode active material. The separator S1 is inserted between terminal electrode E1 and the first bipolar electrode B1 and the separator S2 is inserted between bipolar electrode B1 and bipolar electrode B2, etc. Such a configuration implies that each separator is sandwiched between an anode layer and a cathode layer to form a unit cell. For instance, S2 is sandwiched between the anode layer coated on B1 and the cathode layer coated on B2 to form a unit cell, and S3 is sandwiched between the anode layer coated on B2 and the cathode layer coated on B3 to form another unit cell. These two unit cells are naturally connected in-series through the metal foil at B2, without using an external wire and terminal and, thereby, reducing the weight, volume, and electrical resistance of a SMC stack. Each unit cell can have a lithium source. For instance, lithium may be pre-loaded onto the surfaces of an anode current collector or anode active material prior to assembling the stack.

The number of unit cells in a stack depends upon the needed output voltage of the stack. Using a unit cell voltage of 4.5 volts as a basis, an SMC stack for use in a "battery-operated battery charger operating at 12V, for instance, will require 3 SMC unit cells connected in series. Such a stack constitutes a SMC "element" which, if inserted into a casing and fitted with a PC board (control electronics), makes a great power module. In contrast, the same module will require 5 unit cells (each of 2.5 V) based on conventional EDLC super-capacitor cells containing organic electrolyte and activated carbon electrodes. For the same application, the power source will require 4 lithium-ion cells (typically rated at 3.5-3.7 volts per cell) and 1-2 hours to fully recharge. It takes only minutes to recharge a SMC stack of this size. These comparisons have clearly demonstrated the superiority of the presently disclosed SMC stacks, particularly those that are internally connected.

The presently invented internal series connection (ISC) technology has the following features:
(1) The stack perimeter must be properly sealed to ensure that each and every constituent cell is isolated from one another. In addition, none of the bi-polar current collectors can be porous; they have to be impermeable to electrolyte. The electrolyte from one unit cell is not allowed to enter another unit cell; there is no fluid communication between two cells. In contrast, at least one (usually all) of the current collectors in a parallel-connected configuration is porous.
(2) Any output voltage (V) and capacitance value (Farad, F) or capacity value (mAh) can be tailor-made (any practical voltage can be easily obtained).
(3) During re-charge, each constituent cell can adjust itself to attain voltage distribution equilibrium, removing the need for the high-voltage stack to have a protective circuit.

The surfaces of an SMC electrode material (e.g., graphene-type material) are capable of capturing lithium ions directly from a liquid electrolyte phase and storing lithium atoms on the surfaces in a reversible and stable manner. The electrolyte preferably comprises liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate.

In an internal parallel connection case, multiple anodes are connected together to a terminal of an external circuit or battery charger, and multiple cathodes are connected together to another terminal. To illustrate the operational principle of a stack of SMC cells internally connected in parallel (FIG. 5), one may consider a case wherein a lithium source (e.g. a small piece of lithium foil) is implemented between a battery casing (shell) and a porous anode current collector of a first SMC cell (FIG. 5A). During the first discharge cycle, lithium ions are released from the lithium source, migrating through the pores of the first anode current collector, the pores between graphene sheets (as one example of anode active material), and the pores of a porous polymer separator, reaching surfaces of the first cathode active material (FIG. 5B). The cathode active material is preferably a nano-structured carbon material (e.g. graphene, CNTs, carbon nano-fibers, meso-porous soft carbon, and meso-porous hard carbon) having a high specific surface area to capture and store lithium thereon.

A possible cathode active material comprises functionalized or non-functionalized graphene sheets surrounded by interconnected pores that are preferably meso-scaled (2 nm-50 nm), but can be smaller than 2 nm. These pores allow the direct contact between graphene surfaces and lithium ion-carrying liquid electrolyte. The graphene surface is in direct contact with electrolyte and readily accepts lithium ions from the electrolyte. Some lithium ions (not captured by the first cathode active material) continue to migrate into the second cell where they may be captured by the surfaces of the second cathode active material. This procedure continues if there is a third cell, etc.

Because all the steps (lithium ionization, liquid phase diffusion, and surface trapping/adsorption/capturing) are fast and no solid-state diffusion is required, the whole process is very fast, enabling fast discharging of the SMC stack and a high power density. This is in stark contrast to the conventional lithium-ion battery (LIB) wherein lithium ions are required to diffuse into the bulk of a solid cathode particle (e.g., micron-sized lithium cobalt oxide) during discharge, which is a very slow process. During discharge of the LIB, these lithium ions have to come out of the bulk of graphite particles at the anode. Since liquid electrolyte only reaches the surfaces of these micron-scaled graphite particles (not in direct contact with the graphene planes inside the graphite particle), the lithium de-intercalation step also requires a slow solid-state diffusion.

In the above example, the discharge process continues until either the lithium foil is completely ionized or all the active sites on the cathode active materials in all constituent SMC cells are occupied by lithium atoms. During re-charge (FIG. 5C), lithium ions are released from the massive surfaces of the cathode active material at each cathode, diffuse through liquid electrolyte, and get captured by the surfaces of a nearby anode active material (e.g. simply get electrochemically deposited on a surface of a nano-structured anode material). Again, no solid-state diffusion is required and, hence, the whole process is very fast, requiring a short re-charge time.

Most surprisingly, after one or two discharge/charge cycles, lithium ions are uniformly distributed among constituent cells. In other words, all the cathodes capture essentially the same amount of lithium atoms per unit cathode surface area when the SMC stack is in a discharged state. When the stack is in a charged state, all the anodes capture essentially the same amount of lithium per unit anode surface area.

Clearly, the SMC stack device provides a very unique platform of exchanging lithium ions between the surfaces of one or several anodes and the massive surfaces of one or several cathodes that requires no solid-state diffusion in both electrodes. The process is substantially dictated by the surface-capturing of lithium, plus the liquid-phase diffusion (all being very fast). Hence, the device is herein referred to as a surface-mediated, lithium ion-exchanging battery stack (SMC stack). This is a totally different and patently distinct class of energy storage device than the conventional lithium-ion battery, wherein solid-state diffusion of lithium (intercalation and de-intercalation) is required at both the anode and the cathode during both the charge and discharge cycles.

This new surface-mediated cell is also patently distinct from the conventional supercapacitor based on the electric double layer (EDL) mechanism or pseudo-capacitance mechanism. In both mechanisms, no lithium ions are exchanged between the two electrodes (since lithium is not stored in the bulk and does not reside on surfaces of the electrode; instead, they are stored in the electric double layers near the electrode surfaces). When a supercapacitor is re-charged, the electric double layers are formed near the activated carbon surfaces at both the anode and the cathode sides. When the supercapacitor is discharged, both the negatively charged species and the positively charged species get randomized in the electrolyte (staying further away from electrode material surfaces). In contrast, when a SMC is re-charged, essentially all of the lithium ions are electroplated onto the surfaces of the anode active material and the cathode side is essentially lithium-free. When the SMC is discharged, essentially all the lithium ions are captured by the cathode active material surfaces (stored in the defects or bonded to the benzene ring centers). Very little lithium stays in the electrolyte.

In addition, the supercapacitor does not contain an extra lithium source and, hence, does not involve ionization of lithium from this lithium source. The charge storage capacitance of a supercapacitor (even when using a Li-containing electrolyte) is limited by the amounts of cations and anions that participate in the formation of EDL charges. These amounts are dictated by the original concentration of $Li^+$ ions and their counter ions (anions) from a lithium salt, which are in turn dictated by the solubility limits of these ions in the electrolyte solvent. To illustrate this point, let us assume that only up to 1 mole of $Li^+$ ions can be dissolved in 1 mL of a solvent and there are totally 5 mL of solvent added to a particular supercapacitor cell, Then, there is a maximum of 5 moles of $Li^+$ ions that can be present in the total cell and this amount dictates the maximum amount of charges that can be stored in this supercapacitor.

In contrast (and quite surprisingly), the amounts of lithium ions that can be shuttled between the anode surfaces and the cathode surfaces of a SMC stack are not limited by the chemical solubility of lithium salt in this same solvent. Assume that an identical 5 mL of solvent (containing 5 moles of $Li^+$ ions, as described above for a supercapacitor) is used in the SMC. Since the solvent is already fully saturated with the lithium salt, one would expect that this solvent cannot and will not accept any more $Li^+$ ions from an extra lithium source (5 moles being the maximum). Consequently, one would expect that these 5 moles of $Li^+$ ions are the maximum amount of lithium that we can use to store charges (i.e., the maximum amount of $Li^+$ ions that can be captured by the cathode during discharge, or the maximum amount of $Li^+$ ions that can be captured by the anode during re-charge). Contrary to this expectation by a person of ordinary or even extra-ordinary skill in the art of electrochemistry, we have surprisingly discovered that the amount of $Li^+$ ions that can be captured by the surfaces of either electrode (or, the amount of $Li^+$ ions that can be shuttled between the two electrodes) in a SMC typically far exceeds this solubility limit by 1 or 2 orders of magnitude. The implementation of a lithium source at the anode (or cathode) and a high surface-area active material at the cathode appears to have defied this expectation by providing dramatically more lithium ions than what the solvent can dissolve therein.

We have further discovered that, in a SMC, the amount of lithium capable of contributing to the charge storage is controlled (limited) by the amount of surface active sites of a cathode capable of capturing lithium ions from the electrolyte. This is so even when this amount of surface active sites far exceeds the amount of $Li^+$ ions that the solvent can hold at one time (e.g. 5 moles in the present discussion), provided that the implemented lithium source can provide the extra amount lithium ions beyond 5 moles. These active sites can be just the surface defects of graphene, or the benzene ring centers on a graphene plane. Also quite unexpectedly, lithium atoms are found to be capable of strongly and reversibly bonding to the individual centers of benzene rings (hexagons of carbon atoms) that constitute a graphene sheet, or of being reversibly trapped by graphene surface defect sites. These mechanisms have essentially taken lithium ions out of the liquid electrolyte.

In an embodiment of the portable device, the power source can have a first stack of multiple surface-mediated cells electrically communicating with a DC/DC converter, a boost converter, or a buck-boost converter, which electrically communicates with a second stack of multiple surface-mediated cells. The second stack of multiple surface-mediated cells recharges or provides currents to the first stack of multiple surface-mediated cells.

Alternatively, the power source has a stack of multiple surface-mediated cells electrically communicating with a DC/DC converter, boost converter, or a buck-boost converter, which in turn electrically communicates with an energy storage or energy conversion unit selected from a battery, a supercapacitor, a fuel cell, a solar cell, a thermo-electric unit, a piezoelectric unit (generates charges when an operator moves), a geothermal power-generating unit, a motor power generator, or a combination thereof. The power source can have a stack of multiple surface-mediated cells directly or indirectly communicating with an energy storage or energy conversion unit selected from a battery, a supercapacitor, a fuel cell, a solar cell, a small wind turbine unit, a thermoelectric unit, a geothermal power-generating unit, a piezoelectric unit, a motor power generator, or a combination thereof. The energy storage or energy conversion unit can recharge or provide currents to the stack of multiple surface-mediated cells.

The invention also provides a method of operating the SMC-powered portable computing device. The method comprises varying a current output in response to a power need of the computing device and operating SMC-based power source in a high power zone or in an intermediate zone when the portable computing device demands a pulsed power, wherein the high power zone is defined as having a power density greater than 50 kW/kg$_{(cathode)}$ based on the total cathode weight or greater than 10 kW/kg$_{(cell)}$ based on the total cell weight, and the intermediate zone has a power density between 5 and 50 kW/kg$_{(cathode)}$ or between 1.0 and 10 kW/kg$_{(cell)}$. Another embodiment is a method of operating such a computing device, which method comprises varying a current output in response to a power need of the computing device and operating the power source in a high energy zone or in an intermediate zone when the portable computing device does not demand a pulsed power. The high energy zone is defined as having a power density less than 5 kW/kg$_{(cathode)}$ or less than 1.0 kW/kg$_{(cell)}$. The output current of the SMC can automatically vary responsive to a changing power need of the portable device.

DESCRIPTION OF THE PREFERRED EMBODIMENTS

Figure 6:
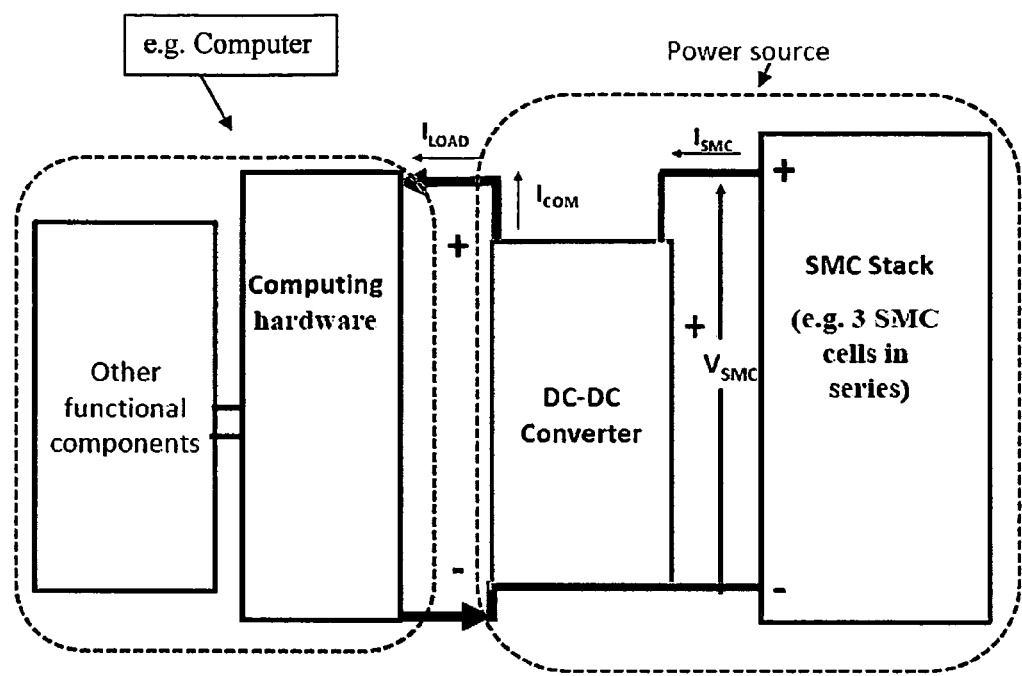
FIG. 6 Schematic of a portable device according to an embodiment of the present invention.

The instant invention provides a portable device (portable computing device) that is powered by a SMC-based power source. As one example to illustrate one preferred embodiment of the present invention, FIG. 6 schematically shows a notebook computer powered by a SMC-based power source. The computer has a computing hardware sub-system and other functional components. The SMC-based power source electrically communicates either directly with the computing hardware or, preferably, indirectly with the computing hardware through a controller, which can include a DC-DC converter, a boost converter, or buck-boost converter. The computing device is selected from a laptop computer, a tablet, an electronic book (e-book), a smart phone, a mobile phone, a digital camera, a hand-held calculator or computer, or a personal digital assistant.

Figure 3:
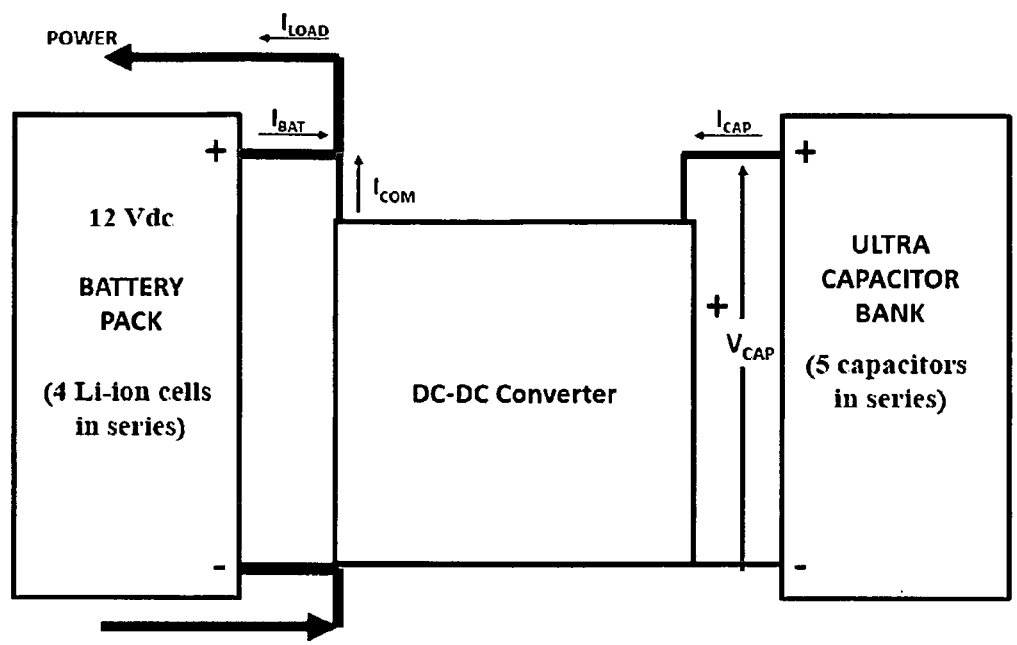

Schematically shown in FIG. 3 is a prior art combined battery-supercapacitor power source for use in a microelectronic device. The lithium-ion battery pack serves to re-charge the supercapacitor bank and provide small currents. The supercapacitor bank is responsible for supplying pulsed power (high currents) to enable certain function of the portable device, e.g. flashlight of a digital camera. Operating the supercapacitor-battery in parallel limits the extraction of total energy from the supercapacitor to that of the battery, a considerable reduction. The supercapacitor-battery combination in series connection limits the current to that of the battery limits. The addition of banks (either battery or supercapacitor) bring increased switching components/complexity, efficiency loss, increased weight and cost.

Figure 1A:
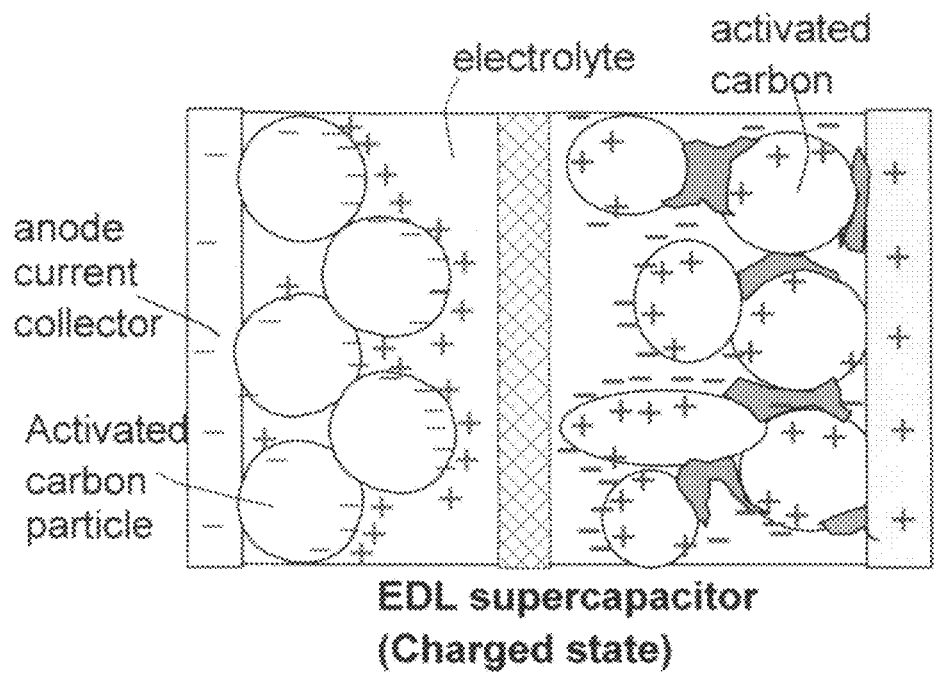
FIG. 1 (A) a prior art electric double-layer (EDL) supercapacitor in the charged state; (B) the same EDL supercapacitor in the discharged state; (C) a prior art lithium-ion battery (LIB) cell in the charged state; (D) the same LIB in the discharged state; (E) a prior art lithium-ion capacitor (LIC) cell in the charged state, using graphite particles as the anode active material and activated carbon (AC) as the cathode active material; (F) the same LIC in the discharged state; (G) another prior art LIC using lithium titanate as the anode active material and AC as the cathode active material.
Figure 1B:
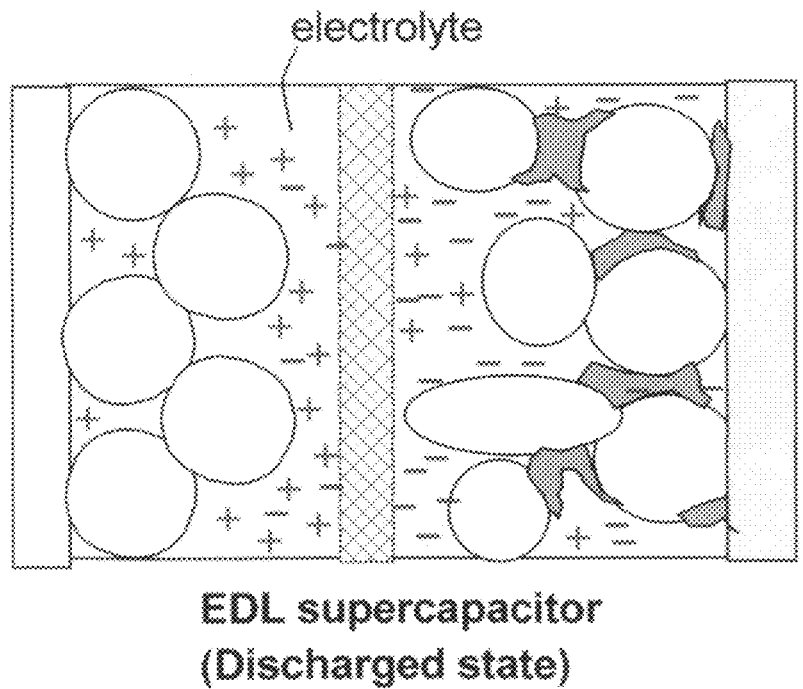
Figure 1C:
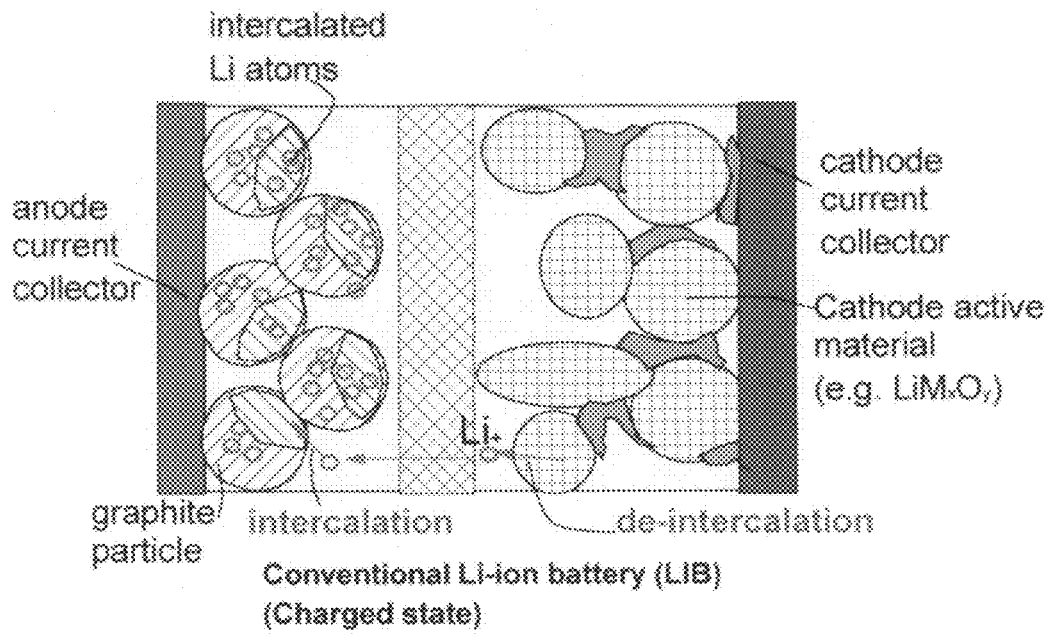
Figure 1D:
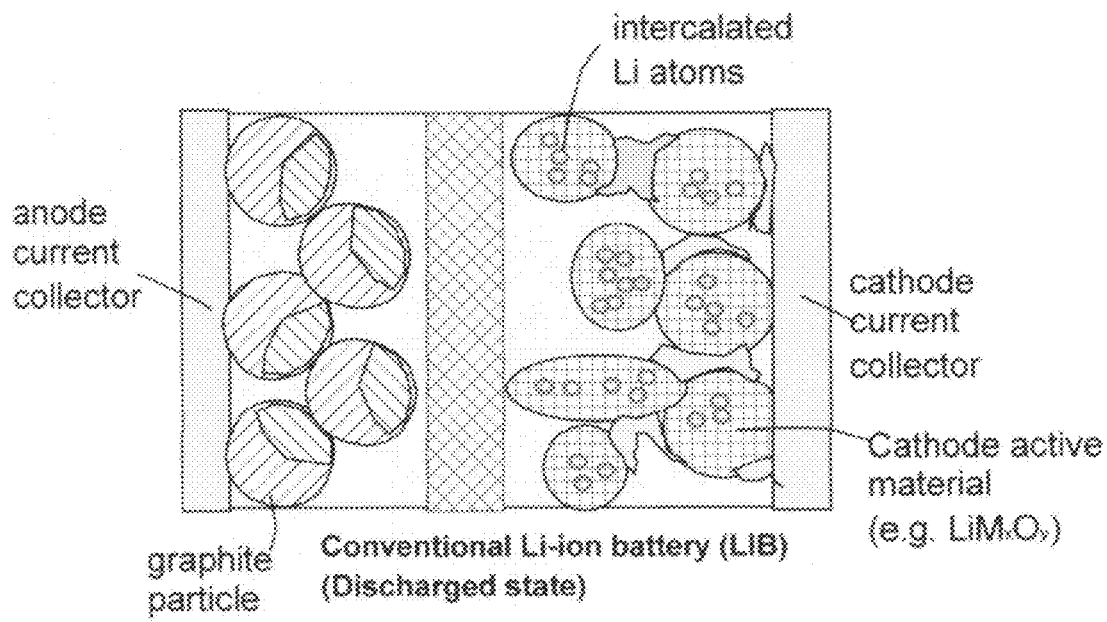
Figure 1E:
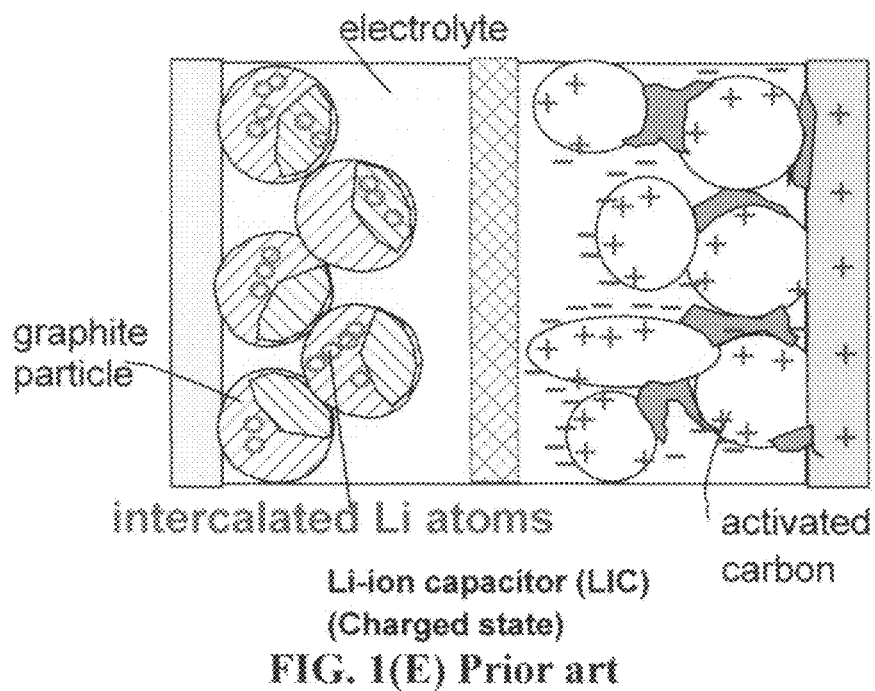
Figure 1F:
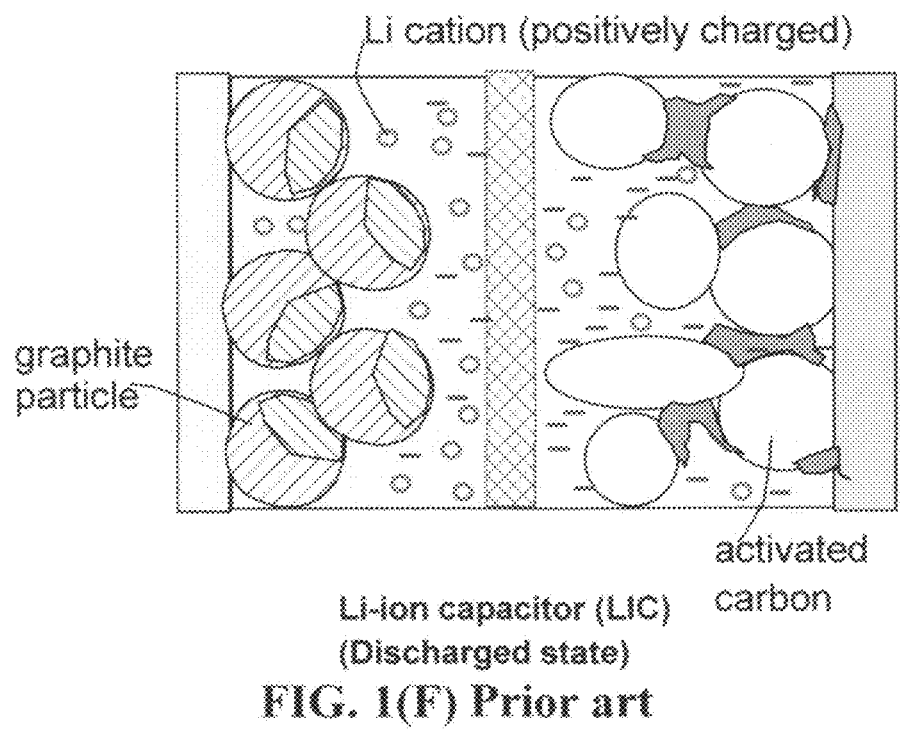
Figure 1G:
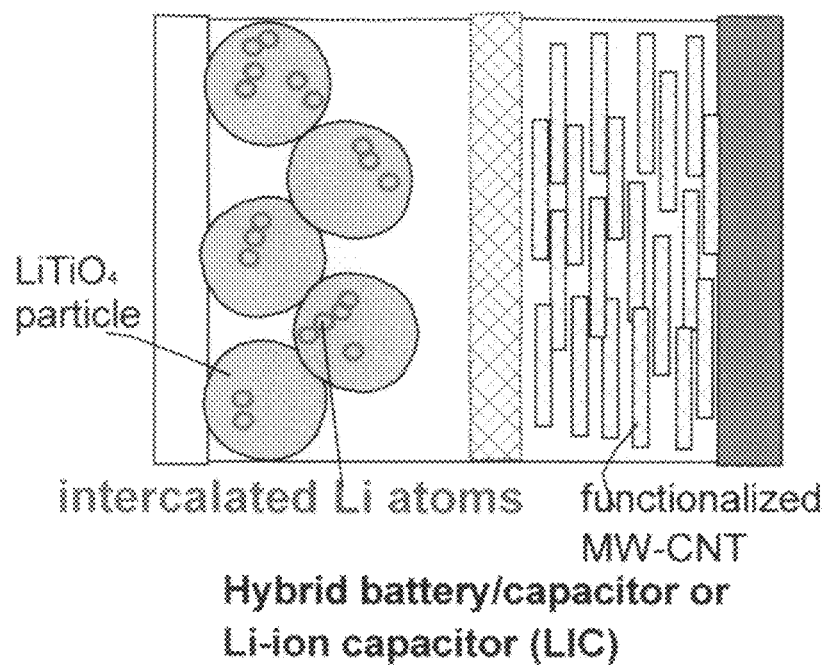
Figure 2:
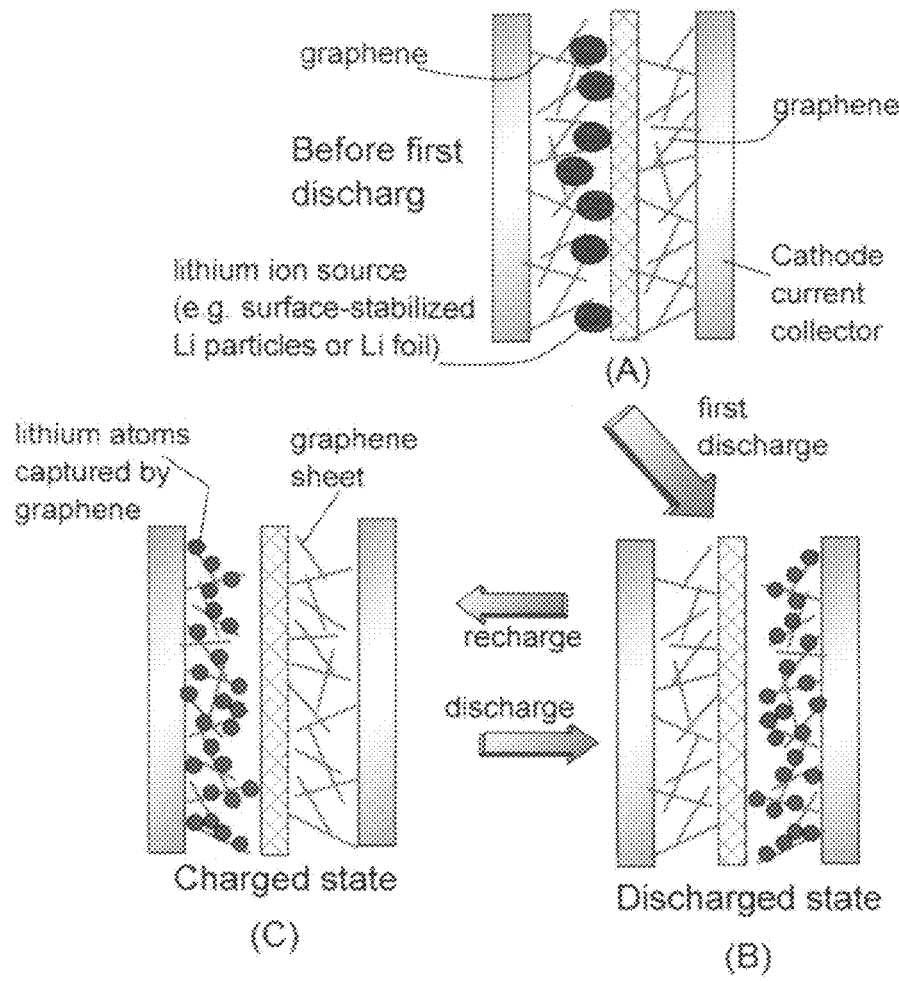
FIG. 2 (A) The structure of a SMC when it is made (prior to the first discharge or charge cycle), containing a nano-structured material at the anode, a lithium source (e.g. lithium foil or surface-stabilized lithium powder), a porous separator, liquid electrolyte, a porous nano-structured material at the cathode having a high specific surface area; (B) The structure of this SMC after its first discharge operation (lithium is ionized with the lithium ions diffusing through liquid electrolyte to reach the surfaces of nano-structured cathode and get rapidly captured by these surfaces); (C) The structure of this battery device after being re-charged (lithium ions are released from the cathode surfaces, diffusing through liquid electrolyte to reach the surfaces of the nano-structured anode and get rapidly plated onto these surfaces). The large surface areas can serve as a supporting substrate onto which massive amounts of lithium ions can electro-deposit concurrently; (D) Center of carbon hexagon in a graphene sheet can readily capture a lithium atom and store thereon; (E) The surface capturing and releasing steps are fast, enabling a SMC cell to charge or discharge in just seconds.
Figure 2:
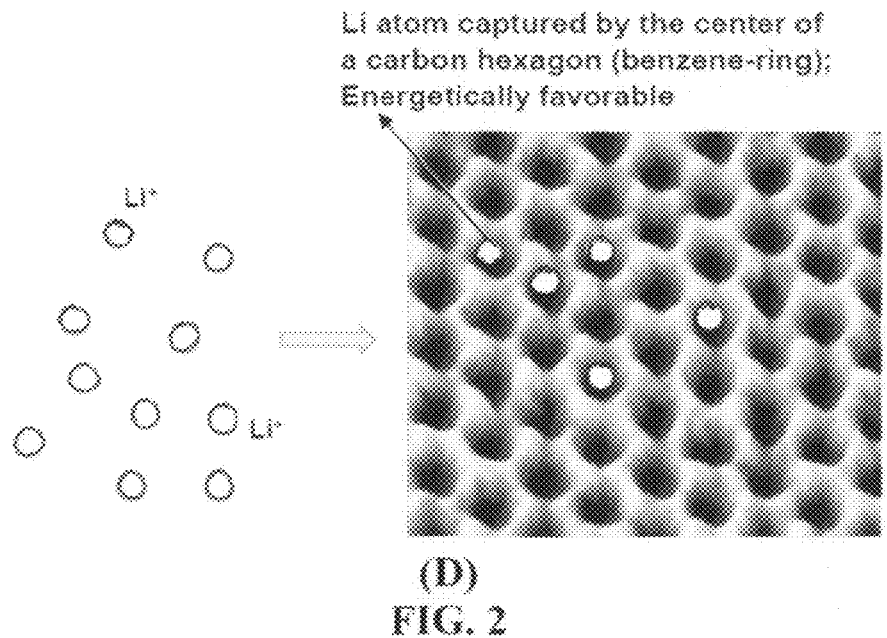
Figure 2:
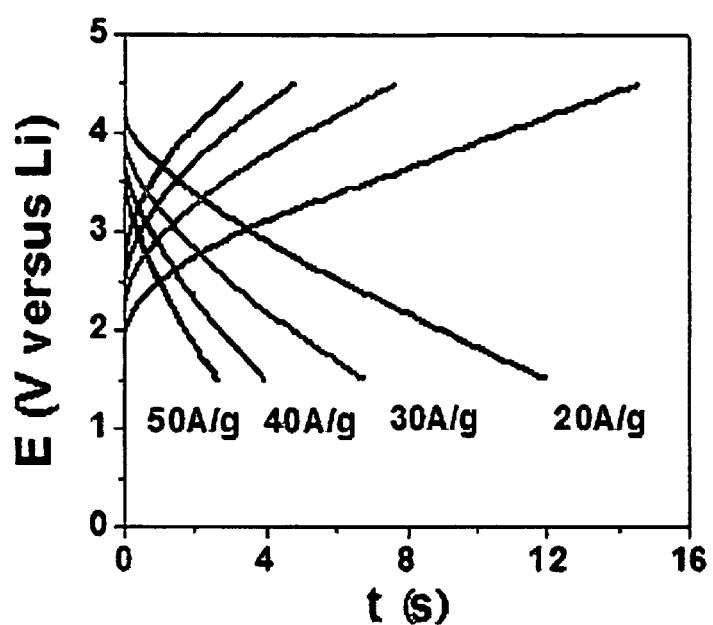
Figure 7A:
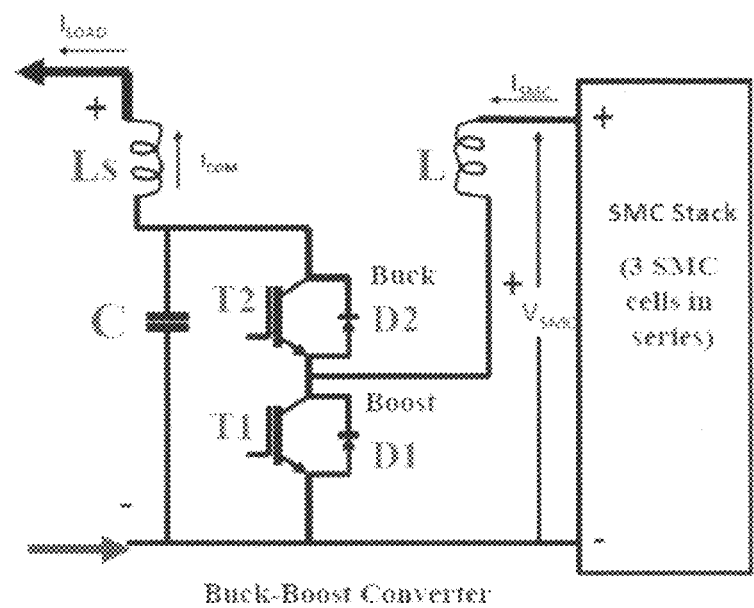
FIG. 7 (A) A SMC stack working with a Buck-Boost converter; (B) A first SMC stack working with a second SMC stack through a Buck-Boost converter; (C) A SMC stack working with a battery stack through a Buck-Boost converter FIG. 8 (A) Ragone plot of a SMC cell, and the energy density-power density value ranges of representative Li-ion, nickel metal hydride, lead-acid, lithium-ion capacitor (LIC), and electric double layer (EDL) supercapacitor cells, indicating that the SMC is a unique and new class of electrochemical energy storage device having both high energy density and power density (all values based on cathode weight); (B) The three operating zones of a SMC: the high power zone (>50 kW/kg$_{(cathode)}$ or >10 kW/kg$_{(cell)}$), the intermediate zone (between 5 and 50 kW/kg$_{(cathode)}$ or between 1.0 and 10 kW/kg$_{(cell)}$), and the high energy zone (<5 kW/kg$_{(cathode)}$ or <1.0 kW/kg$_{(cell)}$.

Additionally, it takes 1-2 hours to recharge a battery stack for a portable device. The SMC-based power source depicted in FIG. 7(A) overcomes these serious issues due to the following features and advantages: (1) The SMC has a high power density (up to 100 kW/kg), even higher than the power density (5 kW/kg) of a supercapacitor. Just like a supercapacitor, it takes seconds or minutes to completely re-charge a SMC (FIG. 2(E)), in stark contrast to hours required to recharge a battery; (2) The SMC has a high energy density, typically 100-300 Wh/kg based on the total cell weight. The energy density of a conventional lithium-ion cell is typically in the range of 120-180 Wh/kg with a power density of <0.5 kW/kg.

The SMC can have or exceed the best of both supercapacitor and battery worlds. Actually, a SMC alone can have a better power density than that of a supercapacitor and the same SMC can have an energy density even higher than that of a conventional lithium-ion battery, as further illustrated in FIG. 8(A). These extraordinary features enable the use of one single SMC device to power an electronic device (e.g. portable computing device). A single SMC alone is superior to the battery-supercapacitor combination in terms of energy density, power density, maximum deliverable current, maximum deliverable amount of energy per device, reduced control circuit complexity, system complexity, weight, and cost.

In a preferred embodiment, a "buck/boost" converter, connected to a SMC cell or stack, can change DC voltages to lower (or higher) depending on how they are configured. This converter works by taking a DC voltage and "flip-flopping" the voltage (e.g. for creating a square wave AC). Then, a simple transformer can raise or lower the voltage. The new AC voltage is converted back to DC and becomes the output. The DC-DC converter, boost converter, or boost-buck converter can be part of the control device or control circuitry.

In an embodiment of the present invention, the portable device further contains a control circuit electrically connected to the SMC-based power source and/or the computing hardware. The circuit includes: (a) input terminals for electrically connecting with respective terminals of the power source that has a predetermined maximum operational current whereby the power source supplies a battery current; (b) output terminals for electrically connecting in parallel the computing hardware; and (c) a controller being disposed between the input and the output terminals for allowing the power source to transfer energy to the hardware while maintaining the battery current at less than the predetermined maximum operational current wherein the hardware draws a load current that varies with time and wherein the load current is greater than or equal to zero and the controller maintains the battery current at greater or equal to zero. The control circuit may be a power-up protection circuit for the computing hardware. The predetermined maximum operational current may be an average over a given interval. The predetermined maximum operational current may be an instantaneous current.

In one embodiment, the power source includes a plurality of battery cells containing at least one SMC. The power source includes a protection circuit for electrically disconnecting the power source terminals from the input terminals in response to the predetermined maximum operational current being exceeded. The controller can be responsive to the battery current for varying a resistance between the input and the output terminals. The controller includes one or more solid-state devices for varying the resistance. At least one of the solid-state devices is preferably a MOSFET. For a portable computing device, the battery voltage is greater than approximately 2.7 Volts and less than approximately 24 Volts.

In another embodiment of the present invention, a single SMC cell or a stack of SMC cells may work in concert with an energy storage or energy conversion unit. Schematically shown in FIG. 7(C) is an example of such a combination, wherein the energy storage unit is a lithium-ion battery stack. The battery stack and the SMC stack can be managed by using an IGBT-controlled step-down/step-up or buck-boost converter. When the portable device demands higher currents or pulsed power, the IGBT initiates the "Boost" operation, allowing the external load to draw extra amounts of current or pulsed power from the SMC stack. If the SMC is connected to a human-powered piezoelectric charge generator, the IGBT operates on the "Buck" mode to store the converted energy to the SMC cells. Due to the SMC's ability to adjust/regulate the portable device's power needs, one can obtain the following benefits: (1) Since the SMC cells are responsible for providing pulsed power and imparting a load-leveling effect to the battery pack, the battery pack can discharge at a steady, lower current rate. As a consequence, the battery can have a longer usage life and exhibits a longer usage time per charge. (2) The SMC also provides the regenerative function, helping to recharge the power system and save energy.

The energy storage or energy conversion unit may be selected from a battery (e.g. a lead-acid, nickel metal hydride, zinc-air, aluminum air, lithium-ion, lithium metal rechargeable, lithium-air, lithium-sulfur, or flow battery), a supercapacitor, a fuel cell, a solar cell, a small wind turbine unit, a thermo-electric unit, a piezoelectric power generator, a geo-thermal power-generating unit, a motor power generator, or a combination thereof.

Figure 7B:
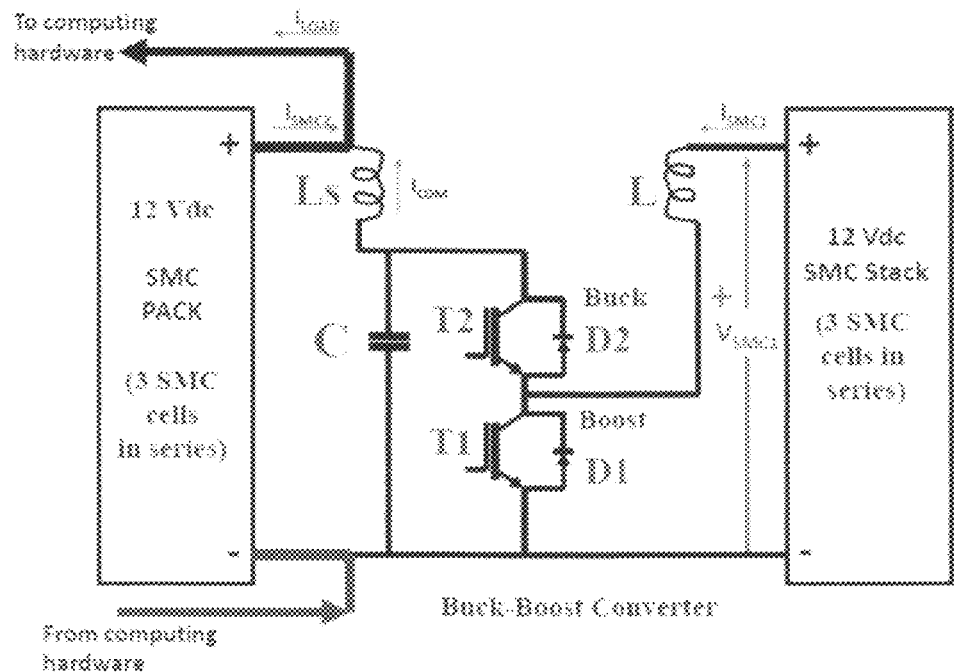
Figure 7C:
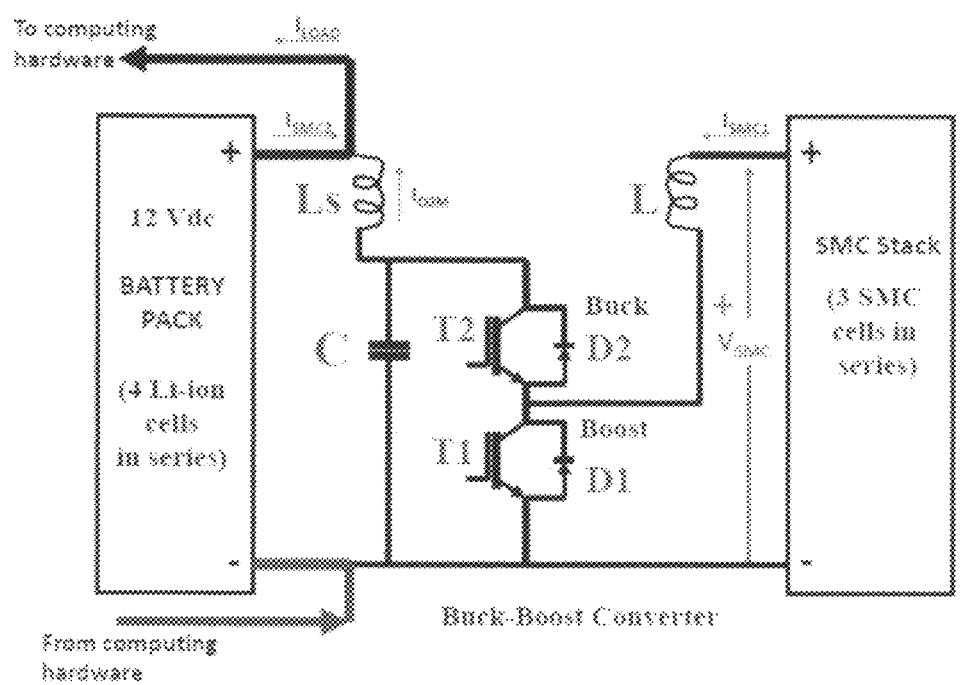

In yet another embodiment of the instant invention, the SMC stack can work with a second SMC stack, as schematically shown in FIG. 7(B). The two SMC stacks can re-charge each other or share the loads. Both can provide high energy and high power.

For some portable computing device, the desired output voltage is less than 4 volts and, hence, one SMC cell is sufficient to provide the required voltage. Demands for a higher voltage may require some series connection, and demands for higher currents or higher total energy may require some parallel connection.

In each stack, multiple SMC cells can be externally or internally connected in parallel, in series, or in a combination thereof. The internal connection in parallel can be preferably accomplished by implementing a tab to each and every current collector and then welding or soldering all cathode tabs together and, separately, welding or soldering all anode tabs together. This internal connection strategy significantly reduces the length of external connecting wires (hence, resistance) and the contact resistance, making it possible for the device to deliver an exceptional power density. This SMC device exhibits a power density significantly higher than the power densities of even the best supercapacitors and dramatically higher than those of conventional lithium ion batteries. This device exhibits an energy density comparable or superior to that of a battery, and significantly higher than those of conventional supercapacitors.

One preferred embodiment of the invention is a portable computing device containing an energy storage stack of at least two surface-mediated cells (SMCs) internally connected in parallel. The stack comprises: (A) a first SMC consisting of (a) a cathode comprising a first porous cathode current collector and a first cathode active material coated on at least one surface (preferably two surfaces) of the first porous cathode current collector, wherein the cathode active material has a surface area to capture or store lithium thereon; (b) a first anode being formed of a first porous anode current collector having a surface area to capture or store lithium thereon; and (c) a first porous separator disposed between the first cathode and the first anode; (B) a second SMC consisting of (d) a second cathode comprising a second porous cathode current collector and a second cathode active material coated on at least one surface (preferably two surfaces) of the second porous cathode current collector, wherein the second cathode active material has a surface area to capture or store lithium thereon; (e) a second anode being formed of a second porous anode current collector having a surface area to capture or store lithium thereon; (f) a second porous separator disposed between the second cathode and the second anode; and (C) a lithium-containing electrolyte in physical contact with all the electrodes, wherein the first or second cathode active material has a specific surface area of no less than 100 m$^2$/g (preferably >500 m$^2$/g, further preferably >1,000 m$^2$/g, even more preferably 1,500 m$^2$/g, and most preferably >2,000 m$^2$/g) being in direct physical contact with the electrolyte to receive lithium ions therefrom or to provide lithium ions thereto; and (D) a lithium source implemented at or near at least one of the anodes or cathodes prior to a first charge or a first discharge cycle of the energy storage stack. The first anode current collector and the second anode current collector are connected to an anode terminal, and the first cathode current collector and the second cathode current collector are connected to a cathode terminal.

Preferably, at least one of the first anode and the second anode further contains an anode active material having a specific surface area of no less than 100 m$^2$/g which is in direct physical contact with the electrolyte to receive lithium ions therefrom or to provide lithium ions thereto. These surface areas are wetted by the electrolyte that carries lithium ions therein. These lithium ions are swimming around in the electrolyte and are ready to get captured by these wetted surfaces. In contrast, the graphite or carbon particles commonly used as an anode active material in a lithium ion battery (LIB) or lithium ion capacitor (LIC) have a very limited exterior surface area (typically <5 m$^2$/g) directly exposed to the liquid electrolyte. The graphene planes that constitute the graphite/carbon particles are not exposed to the electrolyte. The lithium ions contained in the electrolyte reaching the exterior surface of a graphite/carbon particle have to undergo solid-state diffusion (intercalation) in order to enter the interior of a graphite/carbon particle. The intercalation process is very slow and this is why a LIB or LIC cannot have a high power density or short recharge time.

In the parallel-connected SMC stack, preferably at least one of the anode current collectors or the cathode current collectors is an electrically conductive material that forms a porous structure (preferably meso-porous having a pore size in the range of 2 nm and 50 nm). This conductive material may be selected from metal foam, metal web or screen, perforated metal sheet (having pores penetrating from a front surface to a back surface), metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof. These materials can be readily made into an electrode that is porous (preferably having a specific surface area greater than 50 m$^2$/g, more preferably >100 m$^2$/g, further preferably >500 m$^2$/g, even more preferably >1,000 m$^2$/g, and most preferably >1,500 m$^2$/g), allowing liquid electrolyte and the lithium ions contained therein to migrate through.

The lithium source preferably comprises a lithium chip, lithium foil, lithium powder, surface stabilized lithium particles, lithium film coated on a surface of an anode or cathode current collector, lithium film coated on a surface of an anode or cathode active material, or a combination thereof. Coating of lithium on the surfaces of a current collector or an electrode can be accomplished via electrochemical deposition (plating), sputtering, vapor deposition, etc. Preferably, at least one of the anode current collectors or at least one of the cathode active materials is pre-loaded (pre-lithiated, pre-coated, or pre-plated) with lithium before or when the stack is made.

The parallel-connected SMC stack has an open-circuit voltage of at least 0.6 volts and the stack is operated at a voltage no less than 0.6 volts after a first cycle. More commonly, the stack has an open-circuit voltage of at least 1.0 volts and the stack is operated at a voltage no less than 1.0 volts after a first cycle. Most commonly, the stack has an open-circuit voltage of at least 1.5 volts and the stack is operated at a voltage no less than 1.5 volts after a first cycle. The stack can operate in a voltage range of from 1.0 volts to 4.5 volts, more commonly in a voltage range of from 1.5 volts to 4.0 volts.

The electrolyte is preferably liquid electrolyte (organic or ionic liquid) or gel electrolyte containing a lithium salt. The electrolyte contains a first amount of lithium ions dissolved therein. The operation of the SMC stack involves an exchange of a second amount of lithium ions between the cathodes and the anodes, and this second amount of lithium is greater than the first amount. In general, both the anode active material and the cathode active materials are not intercalated or de-intercalated with lithium when the stack is in operation.

Although there is no limitation on the electrode thickness, the presently invented positive electrode preferably has a thickness greater than 5 μm, more preferably greater than 50 μm, and most preferably greater than 100 μm.

Figure 4:
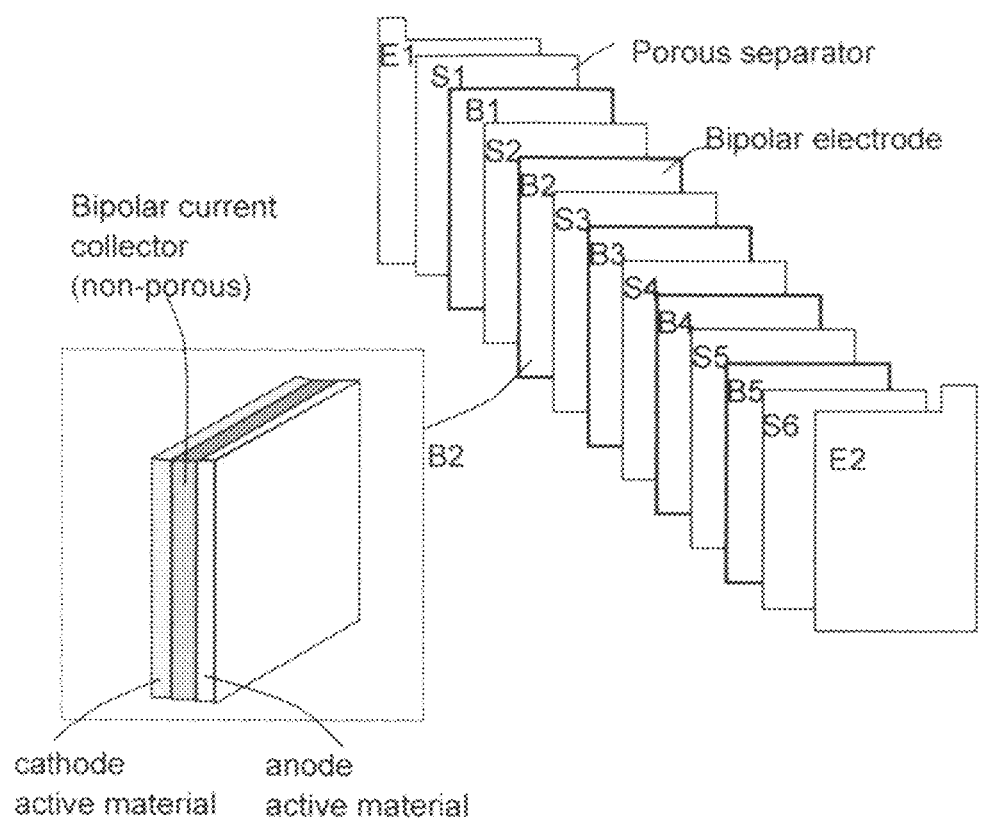
FIG. 4 Schematic of a stack of SMC cells internally connected in series, according to a preferred embodiment of the present invention.
Figure 5:
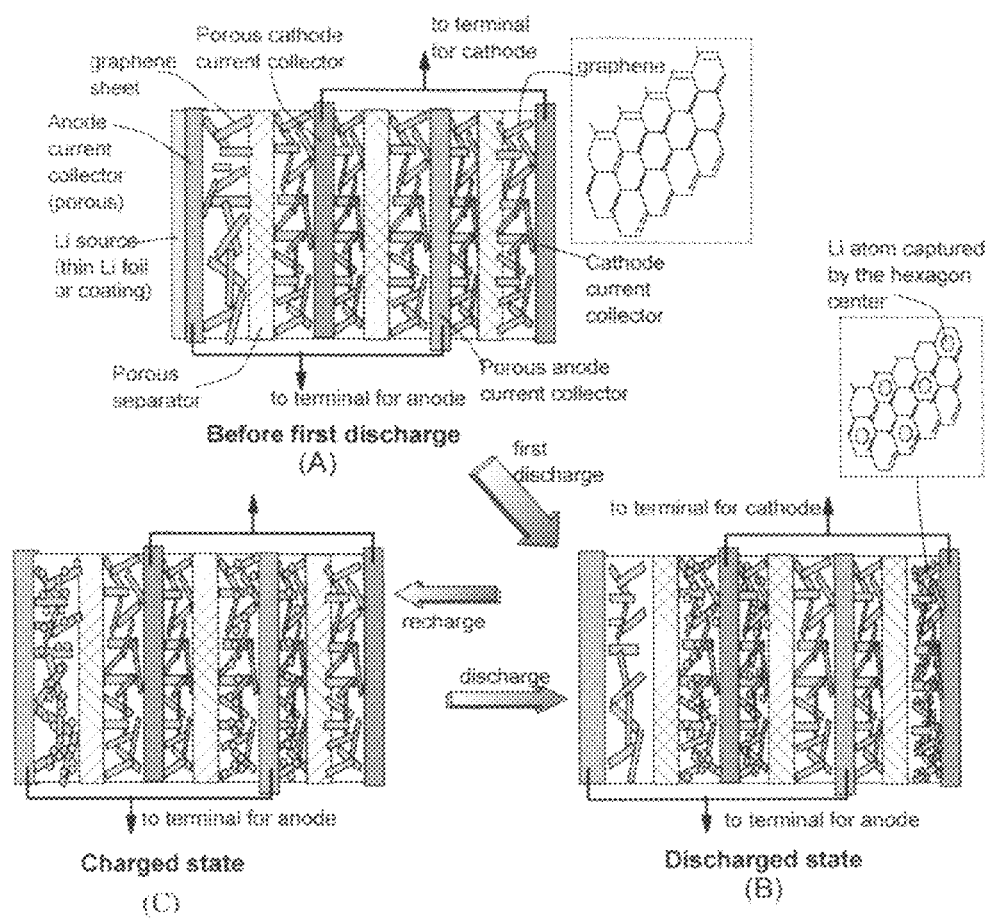
FIG. 5 (A) A stack of parallel-connected SMC cells when it is made (according to another preferred embodiment, wherein a lithium foil is disposed near an anode current collector, or a lithium thin film is deposited on a surface of an anode current collector); (B) the same stack after the first discharge; (C) the same stack after a recharge.

Another preferred embodiment of the present invention is a stack of SMC cells that are internally connected in series. FIG. 4 as one example, the internal series connection strategy involves combining a desired number of bipolar electrodes (e.g. B1-B5), separated from one another by a porous separator (S1-S6), and cladded by two terminal electrodes (E1 and E2). Only these two terminal electrodes are externally connected to the outside circuit and all the intermediate bipolar electrodes are isolated from the outside circuit. Series connection provides a high voltage output, which is the sum of the voltage values of all the cells connected in series.

FIG. 4 provides but one example of the many possible combinations for high-voltage stacks. The five intermediate electrodes (B1-B5) are bipolar electrodes, each composed of a non-porous conductive metal foil having one surface coated with an anode active material and the opposing surface coated with a cathode active material. The separator S1 is inserted between terminal electrode E1 and the first bipolar electrode B1 and the separator S2 is inserted between bipolar electrode B1 and bipolar electrode B2, etc. Such a configuration implies that each separator is sandwiched between an anode layer and a cathode layer to form a unit cell. For instance, S2 is sandwiched between the anode layer coated on B1 and the cathode layer coated on B2 to form a unit cell, and S3 is sandwiched between the anode layer coated on B2 and the cathode layer coated on B3 to form another unit cell. These two unit cells are naturally connected in-series through the metal foil at B2, without using an external wire and terminal and, thereby, reducing the weight, volume, and electrical resistance of a SMC stack.

The current collector layer of a bipolar electrode is a solid, non-porous foil or thin plate that is electronically conducting, but non-permeable to the electrolyte. Any electrically conductive material (e.g. metal foil or conductive polymer film) may be used. A particularly desirable bipolar current collector layer is a two-layer structure with one layer being copper and the other being aluminum. This bi-layer structure can be readily obtained, for instance, by depositing a thin layer of copper on a sheet of aluminum foil or depositing an thin coating of aluminum on a copper foil via sputtering or vapor deposition. Copper is a good current collector for an anode and aluminum is a desirable cathode current collector.

Each unit cell in a series-connected stack has a lithium source. For instance, lithium may be pre-loaded onto the surfaces of an anode current collector or an anode active material prior to assembling the stack. A lithium source may be lithium powder pre-mixed with an anode active material.

The stack of n SMC units internally connected in series has an open-circuit voltage typically greater than 0.6 n volts, more typically greater than 1.0 n volts, and most typically 1.5 n volts or above. Preferably, such an internally series-connected stack operates in a voltage range between 1.0n volts and 4.5n volts (more preferably between 1.5·n volts and 4.0·n volts), where n is an integer greater than 1 and less than 1,000 (typically less than 10 for portable devices).

A particularly useful SMC cathode active material is graphene. Single-layer graphene or the graphene plane (a layer of carbon atoms forming a hexagonal or honeycomb-like structure) is a common building block of a wide array of graphitic materials, including natural graphite, artificial graphite, soft carbon, hard carbon, coke, activated carbon, carbon black, etc. In these graphitic materials, typically multiple graphene sheets are stacked along the graphene thickness direction to form an ordered domain or crystallite of graphene planes. Multiple crystallites of domains are then connected with disordered or amorphous carbon species. In the instant application, we are able to extract or isolate these crystallites or domains to obtain multiple-layer graphene platelets out of the disordered carbon species. In some cases, we exfoliate and separate these multiple-graphene platelets into isolated single-layer graphene sheets. In other cases (e.g. in activated carbon, hard carbon, and soft carbon), we chemically removed some of the disordered carbon species to open up gates, allowing liquid electrolyte to enter into the interior (exposing graphene surfaces to electrolyte).

In the present application, nano graphene platelets (NGPs) or "graphene materials" collectively refer to single-layer and multi-layer versions of graphene, graphene oxide, graphene fluoride, hydrogenated graphene, nitrogenated graphene, doped graphene, boron-doped graphene, nitrogen-doped graphene, etc. In summary, the cathode active material and/or the anode active material of the presently invented SMC may be selected from (a) A porous disordered carbon material selected from a soft carbon, hard carbon, polymeric carbon or carbonized resin, meso-phase carbon, coke, carbonized pitch, carbon black, activated carbon, or partially graphitized carbon; (b) A graphene material selected from a single-layer sheet or multi-layer platelet of graphene, graphene oxide, graphene fluoride, hydrogenated graphene, nitrogenated graphene, boron-doped graphene, nitrogen-doped graphene, functionalized graphene, or reduced graphene oxide; (c) Exfoliated graphite; (d) Meso-porous carbon (including MCMB); (e) A carbon nanotube selected from a single-walled carbon nanotube or multi-walled carbon nanotube; (f) A carbon nano-fiber, metal nano-wire, metal oxide nano-wire or fiber, or conductive polymer nano-fiber, or (g) A combination thereof.

The internal parallel connection of multiple SMC cells to form a stack provides several unexpected advantages over individual cells that are externally connected in parallel:

(1) The internal parallel connection strategy reduces or eliminates the need to have connecting wires (individual anode tabs being welded together and, separately, individual cathode tabs being welded together), thereby reducing the internal and external resistance of the cell module.

(2) In an external connection scenario, each and every SMC cell must have a lithium source (e.g. a piece of lithium foil). Three cells will require three pieces of lithium foils, for instance. This amount is redundant and adds not only additional costs, but also additional weight and volume to a battery pack.

(3) Since only one lithium source is needed in a stack of SMC cells internally connected in parallel, the production configuration is less complex.

(4) We have also observed that the internal parallel connection strategy removes the need to have a protective circuit for every individual SMC cell (in contrast to an externally connected configuration that requires 3 protective circuits for 3 cells). The internal parallel connection appears to impart self-adjusting capability to a stack and each pack needs at most only one protective circuit.

(5) The internal parallel connection strategy enables a stack to achieve a significantly higher power density than what can be achieved by an externally connected pack given an equal number of cells.

The presently invented internal series connection (ISC) technology has the following additional features and advantages:

(6) Any output voltage (V) and capacitance value (Farad, F) can be tailor-made;

(7) The output voltage per SMC unit can be as high as 4.5 volts and, hence, the output voltage of an internal series-connected SMC stack can be a multiple of 4.5 volts (4.5, 9.0, 13.5, 18, 22.5, 27, 31.5, 36 volts, etc.). We can achieve 36 volts with only 8 SMC unit cells connected in series. In contrast, with a unit cell voltage of 2.5 volts for a symmetric supercapacitor, it would take 15 cells to reach 36 volts.

(8) During re-charge, each constituent cell can adjust itself to attain voltage distribution equilibrium, removing the need for the high-voltage stack to have a protective circuit.

Figure 8A:
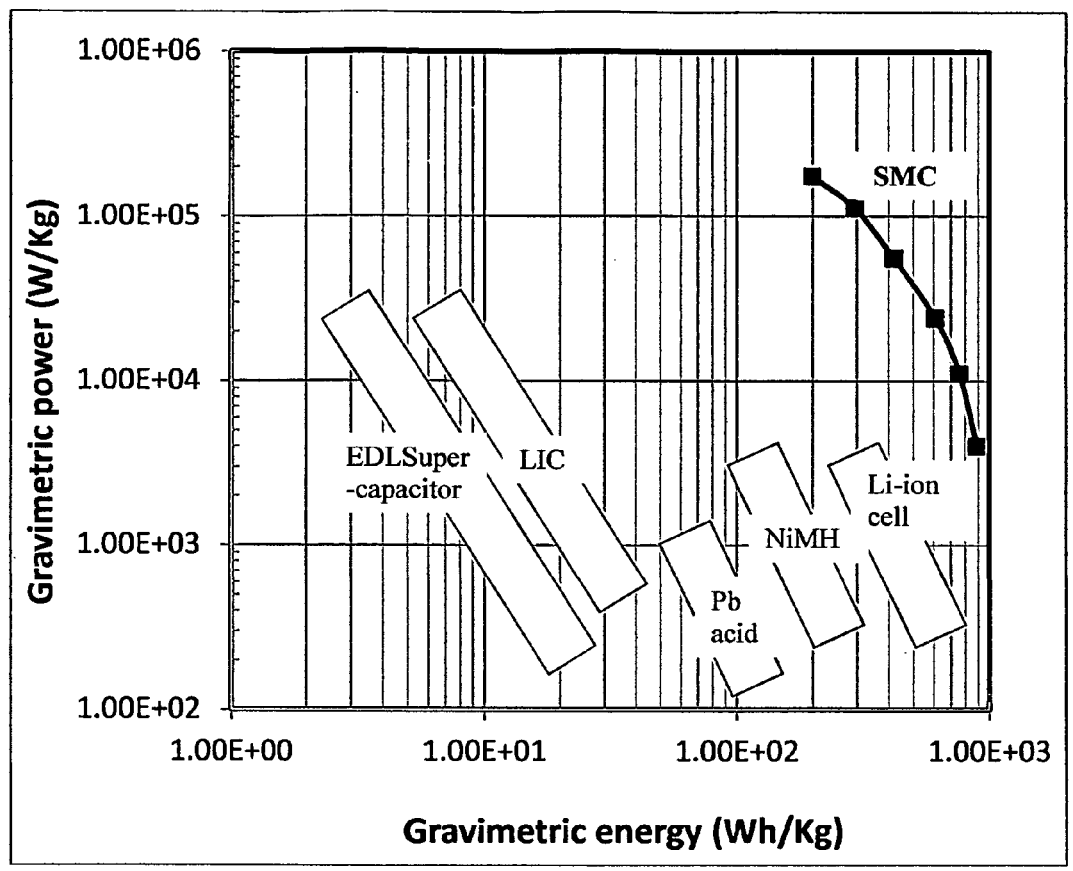

In summary, the instant invention provides a revolutionary energy storage device (for use in a portable microelectronic device) that has exceeded the best features of both the supercapacitor and the lithium ion battery and the combination thereof. As illustrated in FIG. 8(A), these surface-enabled, lithium ion-exchanging cells (internally connected in parallel), with their materials and structures yet to be optimized, are already capable of storing an energy density of 160-300 Wh/kg$_{cell}$, which is 30-60 times higher than that of conventional electric double layer (EDL) supercapacitors. The power density of >100 kW/kg$_{cell}$ is 10 times higher than that (5-10 kW/kg$_{cell}$) of conventional EDL supercapacitors and 200 times higher than that (0.5 kW/kg$_{cell}$) of conventional lithium-ion batteries. These surface-mediated cells can be re-charged in seconds or minutes, as opposed to hours for conventional lithium ion batteries. This is truly a major breakthrough and revolutionary technology.

Figure 8B:
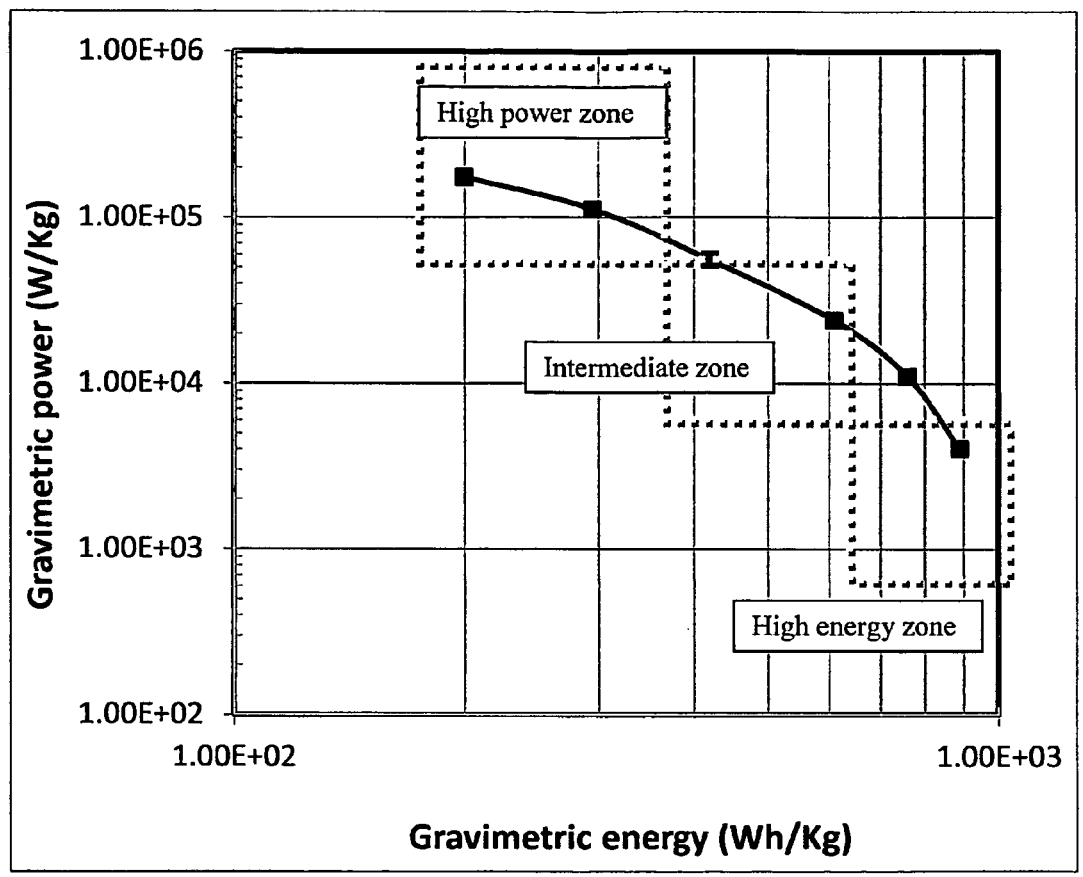

The instant invention also provides a method of operating a SMC-powered portable device. As illustrated in FIG. 8(B), there are three power operating zones to a SMC: the high power zone (>50 kW/kg$_{(cathode)}$ or >10 kW/kg$_{(cell)}$, the intermediate zone (between 5 and 50 kW/kg$_{(cathode)}$ or between 1.0 and 10 kW/kg$_{(cell)}$, and the high energy zone (<5 kW/kg$_{(cathode)}$ or <1.0 kW/kg$_{(cell)}$). The method includes operating an energy storage device in a high power zone and/or intermediate zone responsive to a need for a high current or pulsed power. The energy storage device preferably operates in a high energy zone and/or intermediate zone when a pulsed power or high current is demanded by the portable device.

We claim:

1. A portable computing device powered by a surface-mediated cell-based power source, said portable computing device comprising a computing hardware and a rechargeable power source electrically connected to said hardware and providing power thereto, wherein said power source contains at least a surface-mediated cell (SMC), which is a rechargeable cell that operates by reversibly storing lithium ions on surfaces of a cathode active material, wherein said surface-mediated cell comprises: (a) a positive electrode (cathode) comprising a cathode active material having a surface area to capture or store lithium thereon; (b) a negative electrode (anode) comprising an anode current collector only or comprising an anode current collector and an anode active material; (c) a porous separator disposed between the cathode and the anode; and (d) a lithium-containing electrolyte in physical contact with the anode and the cathode, wherein at least the cathode active material has a specific surface area of no less than 100 m$^2$/g which is in direct physical contact with the electrolyte to receive lithium ions therefrom or to provide lithium ions thereto.

2. The portable computing device of claim 1, wherein said power source contains multiple surface-mediated cells connected in series, in parallel, or having a combination of series and parallel connections.

3. The portable computing device of claim 1, further containing a controller electrically connected to said power source.

4. The portable computing device of claim 3, further containing a DC/DC converter, a voltage-up converter or boost-converter, or a boost-buck converter electrically communicating with said controller.

5. The portable computing device of claim 1 wherein said computing device is selected from a laptop computer, a tablet computer, an electronic book (e-book), a smart phone, a mobile phone, a digital camera, a hand-held calculator or computer, or a personal digital assistant.

6. The portable computing device of claim 1 wherein said power source contains a DC/DC converter, a voltage-up converter or boost-converter, or a boost-buck converter electrically connected to a surface-mediated cell or a stack of multiple surface-mediated cells.

7. The portable computing device of claim 1 wherein said power source contains a stack of a first SMC and at least a second SMC that are internally connected in series, wherein said stack contains at least a bipolar electrode made of a non-porous but electronically conducting solid layer having one surface optionally coated with an anode active material and an opposing surface coated with a cathode active material, and the electrolyte in the first SMC is not in fluid communication with the electrolyte in the second SMC.

8. The portable computing device of claim 1 wherein said power source has a first stack of multiple battery cells containing at least one surface-mediated cells electrically communicating with a DC/DC converter, a boost converter, or a buck-boost converter, which electrically communicates with a second stack of multiple battery cells containing at least one surface-mediated cell.

9. The portable computing device of claim 8 wherein said second stack of multiple battery cells recharges or provides currents to said first stack of multiple surface-mediated cells.

10. The portable computing device of claim 1 wherein said power source has a stack of multiple surface-mediated cells electrically communicating with a DC/DC converter, a boost converter, or a buck-boost converter, which electrically communicates with an energy storage or energy conversion unit selected from a battery, a supercapacitor, a fuel cell, a thermo-electric unit, a photovoltaic unit, or a combination thereof.

11. The portable computing device of claim 1 wherein said power source has a stack of multiple surface-mediated cells electrically communicating with an energy storage or energy conversion unit selected from a battery, a supercapacitor, a fuel cell, a thermo-electric unit, a photovoltaic unit, or a combination thereof.

12. The portable computing device of claim 10, wherein the battery is selected from a nickel metal hydride, zinc-air, aluminum air, lithium-ion, lithium metal rechargeable, lithium-air, lithium-sulfur, or flow battery.

13. The portable computing device of claim 11, wherein the battery is selected from a lead-acid, nickel metal hydride, zinc-air, aluminum air, lithium-ion, lithium metal rechargeable, lithium-air, lithium-sulfur, or flow battery.

14. The portable computing device of claim 12 wherein said energy storage or energy conversion unit recharges or provides currents to said stack of multiple surface-mediated cells.

15. The portable computing device of claim 13 wherein said energy storage or energy conversion unit recharges or provides currents to said stack of multiple surface-mediated cells.

16. The portable computing device of claim 1 further containing a control circuit electrically connected to said power source and/or said computing hardware, wherein said circuit including: (a) input terminals for electrically connecting with respective terminals of said power source that has a predetermined maximum operational current whereby the power source supplies a battery current; (b) output terminals for electrically connecting in parallel the computing hardware; and (c) a controller being disposed between the input and the output terminals for allowing the power source to transfer energy to the hardware while maintaining the battery current at less than the predetermined maximum operational current wherein the hardware draws a load current that varies with time and wherein the load current is greater than or equal to zero and the controller maintains the battery current at greater or equal to zero.

17. The portable computing device of claim 16, wherein said control circuit is a power-up protection circuit for said computing hardware.

18. The portable computing device of claim 16, wherein the predetermined maximum operational current is an average over a given interval.

19. The portable computing device of claim 16, wherein the predetermined maximum operational current is an instantaneous current.

20. The portable computing device of claim 16, wherein the power source includes a plurality of battery cells containing at least one SMC.

21. The portable computing device of claim 16, wherein the power source includes a protection circuit for electrically disconnecting the power source terminals from the input terminals in response to the predetermined maximum operational current being exceeded.

22. The portable computing device of claim 16, wherein the controller is responsive to the battery current for varying a resistance between the input and the output terminals.

23. The portable computing device of claim 22, wherein the controller includes one or more solid-state devices for varying the resistance.

24. The portable computing device of claim 23, wherein at least one of the solid-state devices is a MOSFET.

25. The portable computing device of claim 16, wherein the battery voltage is greater than approximately 2.7 Volts and less than approximately 24 Volts.

26. The portable computing device of claim 1 wherein said DC-DC converter, boost converter, or boost-buck converter performs a voltage flip-flopping function.

27. A method of operating the portable computing device of claim 1, which method comprises varying a current output in response to a power need of said computing device and operating said power source in a high power zone or in an intermediate zone when said portable computing device demands a pulsed power, wherein said high power zone is defined as having a power density greater than 50 kW/$kg_{(cathode)}$ based on the total cathode weight or greater than 10 kW/$kg_{(cell)}$ based on the total cell weight, and said intermediate zone has a power density between 5 and 50 kW/$kg_{(cathode)}$ or between 1.0 and 10 kW/$kg_{(cell)}$.

28. A method of operating the portable computing device of claim 1, which method comprises varying a current output in response to a power need of said computing device and operating said power source in a high energy zone or in an intermediate zone when said portable computing device does not demand a pulsed power, wherein said high energy zone is defined as having a power density less than 5 kW/$kg_{(cathode)}$ or less than 1.0 kW/$kg_{(cell)}$ and said intermediate zone has a power density between 5 and 50 kW/$kg_{(cathode)}$ or between 1.0 and 10 kW/$kg_{(cell)}$.

29. A method of operating the portable computing device of claim 1, which method comprises varying a current output in response to a change in power need of said computing device.

* * * * *